US012511152B2

(12) United States Patent
Wang et al.

(10) Patent No.: US 12,511,152 B2
(45) Date of Patent: Dec. 30, 2025

(54) SYSTEM AND INTERRUPT HANDLING METHOD

(71) Applicant: Huawei Technologies Co., Ltd., Guangdong (CN)

(72) Inventors: Haibin Wang, Hangzhou (CN); Zenghui Yu, Hangzhou (CN); Jian Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 18/146,943

(22) Filed: Dec. 27, 2022

(65) Prior Publication Data
US 2023/0133273 A1    May 4, 2023

Related U.S. Application Data

(63) Continuation of application No. PCT/CN2021/102011, filed on Jun. 24, 2021.

(30) Foreign Application Priority Data

Jun. 29, 2020 (CN) .......................... 202010604993.9

(51) Int. Cl.
*G06F 9/48* (2006.01)
*G06F 9/455* (2018.01)

(52) U.S. Cl.
CPC ........ *G06F 9/4831* (2013.01); *G06F 9/45558* (2013.01); *G06F 2009/45575* (2013.01)

(58) Field of Classification Search
CPC ............... G06F 9/4831; G06F 9/45558; G06F 2009/45575; G06F 9/4812; G06F 2009/45579; G06F 9/45545

(Continued)

(56) References Cited

U.S. PATENT DOCUMENTS 7,209,994 B1 * 4/2007 Klaiber ............... G06F 9/45533
710/262
10,642,498 B2 * 5/2020 Benisty ................. G06F 3/0688
(Continued)

FOREIGN PATENT DOCUMENTS

CN     103744716 A    4/2014
CN     106462451 B    11/2019
(Continued)

OTHER PUBLICATIONS

Bugnion Edouard et al:"Virtualization Support in ARM Processors", In:"Hardware and Software Support for Virtualization", Jan. 1, 2017, total 24 pages, XP093097806,URL:https://link.springer.com/content/pdf/10.1007/978-3-031-01753-7_7.
(Continued)

*Primary Examiner* — Idriss N Alrobaye
*Assistant Examiner* — Henry W Yu
(74) *Attorney, Agent, or Firm* — WOMBLE BOND DICKINSON (US) LLP

(57) ABSTRACT

Embodiments of the present disclosure disclose a computing device, and are applied to the field of computing devices. In the present disclosure, a virtual interrupt obtained by a host machine is mapped to a physical interrupt of a physical layer, and a virtual interrupt identifier corresponding to the physical interrupt is transferred to a virtual processor by using the physical layer. When a hardware layer transparently transmits the virtual interrupt identifier to the virtual processor, the virtual processor does not need to exit. This decreases a delay caused by exit of the virtual processor when software implements virtual interrupt routing.

20 Claims, 9 Drawing Sheets

(58) Field of Classification Search
USPC ............ 710/3, 15, 18, 36, 62, 261, 265, 267
See application file for complete search history.

(56) References Cited

U.S. PATENT DOCUMENTS

| | | | | |
|---|---|---|---|---|
| 11,042,494 | B1* | 6/2021 | Saidi | .................... G06F 11/0712 |
| 2007/0157197 | A1* | 7/2007 | Neiger | ................ G06F 9/45533 |
| | | | | 718/1 |
| 2014/0351471 | A1* | 11/2014 | Jebson | .................... G06F 13/24 |
| | | | | 710/269 |
| 2015/0127866 | A1* | 5/2015 | Zeng | .................. G06F 9/45558 |
| | | | | 710/264 |
| 2016/0085568 | A1* | 3/2016 | Dupre | ................... G06F 9/4812 |
| | | | | 718/1 |
| 2017/0102963 | A1* | 4/2017 | Zhang | ................. G06F 9/45533 |
| 2020/0167176 | A1* | 5/2020 | Arroyo | ............... G06F 9/45558 |

FOREIGN PATENT DOCUMENTS

| | | |
|---|---|---|
| JP | S61240333 A | 10/1986 |
| JP | S6394629 A | 4/1988 |
| JP | 2013519169 A | 5/2013 |
| JP | 2017518589 A | 7/2017 |
| WO | 2016092667 A1 | 6/2016 |

OTHER PUBLICATIONS

Anonymous:"GICv3 and GICv4 Software Overview", Jan. 1, 2016, total 50 pages, XP093097395, URL:https://documentation-service.arm.com/static/5f1068720daa596235e7f6ef?token=[retrieved on Nov. 2, 2023].

* cited by examiner

SYSTEM AND INTERRUPT HANDLING METHOD

CROSS-REFERENCE TO RELATED APPLICATIONS

This application is a continuation of International Application No. PCT/CN2021/102011, filed on Jun. 24, 2021, which claims priority to Chinese Patent Application No. 202010604993.9, filed on Jun. 29, 2020. The disclosures of the aforementioned applications are hereby incorporated by reference in their entireties.

TECHNICAL FIELD

Embodiments of the present disclosure relate generally to the computer field, and more particularly, to a system and an interrupt handling method.

BACKGROUND

A virtualization technology adds software layers, including a host machine layer and a virtual computer layer, to a physical computer, to implement "virtualization" and "isolation" of hardware of the physical computer. Each software layer includes different running modes, for example, a user mode and a kernel mode. Diversification of the software layers and the running modes increases processing steps for some requirements in the physical computer, and a delay in processing these requirements is increased.

Interrupt handling is a key requirement of a computing device. In an existing interrupt handling process of the computing device, a virtual machine monitor (VMM) provides a virtual interrupt controller and a virtual interrupt translation service for a user by using an interrupt virtualization technology. A process of transferring a virtual interrupt to a virtual processor is controlled based on software of the virtual machine monitor. In some embodiments, the VMM may implement the process by writing the virtual interrupt into a register corresponding to the virtual processor. However, in conventional systems, the VMM can write the virtual interrupt into a system register corresponding to a virtual central processing unit (CPU) only when the virtual CPU of a virtual machine is scheduled to re-obtain permission to use a physical CPU. To ensure timely writing of the virtual interrupt, the VMM proactively triggers the virtual machine to exit (VM-exit), and writes the virtual interrupt into the system register corresponding to the virtual CPU when next virtual machine entry (VM-entry) occurs. In this case, each time the VMM writes the virtual interrupt, the virtual processor temporarily stops running. Consequently, a delay in handling the virtual interrupt is increased.

SUMMARY

In some embodiments, the present disclosure provides a computing device. The computing device includes a hardware layer and a host machine running on the hardware layer, and the host machine is configured to obtain a virtual interrupt. The virtual interrupt may be enabled for a virtual device in a virtual machine, and the virtual device may be a virtual device simulated by software, for example, a serial port simulated by software. A back-end driver (for example, a QEMU (Quick EMUlator)) in the host machine may obtain a virtual interrupt enabling behavior of the virtual machine, and trigger the virtual interrupt. The virtual interrupt may include a virtual device identifier device ID and a virtual interrupt vector identifier vector ID. When an interrupt resource is initialized, the virtual device identifier device ID and the virtual interrupt vector identifier vector ID are allocated to a virtual processor of the virtual machine. Each virtual processor uniquely corresponds to one virtual device identifier device ID and a plurality of virtual interrupt vector identifiers vector IDs. The virtual device identifier device ID in the virtual interrupt may indicate which virtual device enables the virtual interrupt, and the virtual interrupt vector identifier vector ID may indicate a virtual interrupt in a plurality of virtual interrupts allocated by the virtual device.

After triggering the virtual interrupt, the back-end driver (for example, the QEMU) may transfer the virtual interrupt to a VMM. Correspondingly, the VMM in the host machine may obtain the virtual interrupt; and obtain a corresponding physical interrupt identifier based on the virtual interrupt, and transfer the physical interrupt identifier to the hardware layer. The hardware layer is configured to: obtain, based on the physical interrupt identifier, a corresponding virtual interrupt identifier and a corresponding virtual processor identifier, where the virtual interrupt is configured to interrupt a target virtual processor, the virtual interrupt and the physical interrupt identifier uniquely correspond to the virtual processor identifier, and the virtual processor identifier indicates the target virtual processor; and transfer the virtual interrupt identifier to the target virtual processor.

In some embodiments, the hardware layer may include a physical interrupt translation service (ITS) and a physical generic interrupt controller (GIC). The physical ITS may obtain a physical interrupt, and the physical interrupt is used to interrupt a virtual CPU. The physical ITS may determine a virtual CPU corresponding to the physical interrupt, and determine the virtual interrupt identifier (which may indicate a virtual interrupt) corresponding to the physical interrupt. The physical GIC may send the virtual interrupt identifier to the virtual CPU. The physical ITS may include a register and an operation circuit. The register may store a correspondence between the physical interrupt and the virtual interrupt identifier (such as storing a base address of the correspondence between the physical interrupt and the virtual interrupt identifier); and a correspondence between the physical interrupt and the virtual processor identifier (such as storing a base address of the correspondence between the physical interrupt and the virtual processor identifier). The operation circuit may obtain the correspondences from the register (the operation circuit may obtain the base addresses from the register, and obtain the correspondence between the physical interrupt and the virtual interrupt identifier and the correspondence between the physical interrupt and the virtual processor identifier from the register based on the base addresses); and determine a virtual CPU corresponding to the received physical interrupt identifier, and determine the virtual interrupt identifier corresponding to the physical interrupt identifier. The GIC may be implemented based on an operation circuit in a chip of an ARM (Advanced RISC Machine) architecture, and the physical GIC is an advanced microcontroller bus architecture (AMBA), and a peripheral device of a system on a chip (SoC) compatible with the ARM architecture. The physical GIC has an on-chip AMBA bus interface.

When the hardware layer transparently transmits the virtual interrupt identifier to the target virtual processor, it is not required that the hardware layer writes the virtual interrupt identifier into a system register corresponding to the virtual processor, and then the virtual processor obtains the virtual interrupt identifier from the system register when the virtual processor runs again. Instead, the virtual interrupt identifier is directly transferred to the target virtual processor. In some embodiments, the virtual interrupt identifier may be written into an interface that corresponds to the virtual processor and that is in a physical memory, and the virtual processor may obtain the virtual interrupt identifier based on the interface. Therefore, the target virtual processor does not need to exit. This decreases a delay caused by exit of the virtual processor when software implements virtual interrupt routing.

In some embodiments, the virtual interrupt uniquely corresponds to the virtual interrupt identifier.

In some embodiments, the computing device includes the physical interrupt translation service ITS and the physical generic interrupt controller GIC that are implemented based on the hardware layer.

The physical ITS is configured to obtain, based on the physical interrupt identifier, the corresponding virtual interrupt identifier and the corresponding virtual processor identifier.

The physical GIC is configured to transfer the virtual interrupt identifier to the target virtual processor.

In some embodiments, the host machine is further configured to obtain, based on the virtual interrupt and a preconfigured first mapping relationship, the physical interrupt identifier corresponding to the virtual interrupt, where the first mapping relationship indicates a plurality of virtual interrupts and a correspondence between each virtual interrupt and a physical interrupt identifier. For example, the first mapping relationship may include N virtual interrupts and N physical interrupt identifiers. The N virtual interrupts one-to-one correspond to the N physical interrupt identifiers, each of the N virtual interrupts corresponds to one physical interrupt identifier, and each of the N physical interrupt identifiers corresponds to one virtual interrupt.

The hardware layer is further configured to obtain, based on the physical interrupt identifier and a preconfigured second mapping relationship, the virtual interrupt identifier corresponding to the physical interrupt, where the second mapping relationship indicates a plurality of physical interrupt identifiers and a correspondence between each physical interrupt identifier and a virtual interrupt identifier. For example, the second mapping relationship may include N physical interrupt identifiers and N virtual interrupt identifiers. The N physical interrupt identifiers one-to-one correspond to the N virtual interrupt identifiers, each of the N physical interrupt identifiers corresponds to one virtual interrupt identifier, and each of the N virtual interrupt identifiers corresponds to one physical interrupt identifier.

In some embodiments, the hardware layer is further configured to obtain, based on the physical interrupt identifier and a preconfigured third mapping relationship, the corresponding virtual processor identifier, where the third mapping relationship indicates a plurality of physical interrupt identifiers and a correspondence between each physical interrupt identifier and a virtual processor identifier. For example, the third mapping relationship may include N physical interrupt identifiers and N virtual processor identifiers, each of the N physical interrupt identifiers corresponds to one virtual processor identifier, and each of the N virtual processor identifiers corresponds to one or more physical interrupt identifiers.

To transparently transmit the virtual interrupt obtained by the VMM to the corresponding virtual processor by using the hardware layer, and ensure that the virtual processor can receive a correct virtual interrupt identifier, a new mapping relationship (which may be referred to as the first mapping relationship below) needs to be preconfigured on the VMM, and a new mapping relationship (which may be referred to as the second mapping relationship and the third mapping relationship below) is adaptively configured on the hardware layer. The mapping relationship configured on the VMM and the mapping relationship configured on the hardware layer may be mutually configured, so that the VMM may convert, based on the first mapping relationship, the obtained virtual interrupt (including the virtual device identifier device ID and the virtual interrupt vector identifier vector ID) into a physical interrupt identifier (for example, including the physical device identifier device ID and the physical interrupt vector identifier vector ID) that can be identified by the hardware layer (for example, the physical ITS). In addition, the hardware layer may determine, based on the preconfigured second mapping relationship, the virtual interrupt identifier corresponding to the physical interrupt identifier; and determine, based on the preconfigured third mapping relationship, the virtual processor identifier corresponding to the physical interrupt identifier. The virtual processor identifier uniquely corresponds to the target virtual processor.

To ensure that the virtual processor can receive a correct virtual interrupt identifier, the virtual interrupt identifier determined by the hardware layer based on the preconfigured second mapping relationship needs to be consistent with a virtual interrupt identifier corresponding to a virtual interrupt determined by the VMM in virtual interrupt transfer implemented through software. In addition, the virtual processor identifier determined by the hardware layer based on the preconfigured third mapping relationship needs to be consistent with a virtual processor identifier corresponding to the virtual interrupt determined by the VMM in the virtual interrupt transfer implemented through software.

In some embodiments, the hardware layer is further configured to generate the physical interrupt based on the physical interrupt identifier; and obtain the virtual interrupt identifier and the virtual processor identifier based on the physical interrupt.

In some embodiments, the host machine may transfer an interrupt generation request that carries the physical interrupt identifier to the physical ITS on the hardware layer, and the physical ITS may generate the corresponding physical interrupt based on the interrupt generation request that carries the physical interrupt identifier.

In some embodiments, the host machine may write the physical interrupt identifier into a target register located on the hardware layer, so that the target register generates the physical interrupt.

In some embodiments, the host machine may write the physical interrupt identifier into the target register located on the hardware layer. The target register has a capability of generating the physical interrupt through software, and the physical ITS may obtain the physical interrupt from the target register.

In some embodiments, the virtual interrupt includes a virtual device identifier and a virtual interrupt vector identifier.

The host machine is further configured to obtain, based on the virtual interrupt, a physical device identifier corresponding to the virtual device identifier and a physical interrupt vector identifier corresponding to the virtual interrupt vector identifier. The physical interrupt identifier includes the physical device identifier and the physical interrupt vector identifier.

In some embodiments, the hardware layer is further configured to obtain interrupt state information corresponding to the physical interrupt identifier, where the interrupt state information indicates whether the virtual interrupt identifier corresponding to the physical interrupt identifier can be transferred to the virtual processor. In some embodiments, the interrupt state information may include at least one of the following: an interrupt pending state, an interrupt priority state, and an interrupt enable state. The hardware layer is further configured to determine, based on the interrupt state information, that the virtual interrupt identifier can be transferred to the virtual processor.

The interrupt pending information may indicate that the virtual interrupt is in a pending/active state, the interrupt priority state may indicate a priority of a current virtual interrupt in all to-be-processed virtual interrupts, and the interrupt enable state may indicate whether an interrupt can be transferred to a processor. In some embodiments, if the physical interrupt identifier is in an enabled state, and the priority state and the pending state meet conditions, the virtual interrupt identifier corresponding to the physical interrupt identifier can be transferred to the virtual processor.

In some embodiments, the host machine is further configured to:
  obtain the interrupt state information corresponding to the physical interrupt identifier from the hardware layer in a virtual machine live migration process, where the interrupt state information indicates whether the virtual interrupt identifier corresponding to the physical interrupt identifier can be transferred to the virtual processor, and the interrupt state information may include at least one of the following: the interrupt pending state, the interrupt priority state, and the interrupt enable state; and write the interrupt state information into a hardware layer of a computing device other than the computing device.

In some embodiments, the present disclosure provides an interrupt handling method. The method is applied to a host machine, the host machine runs on a hardware layer, and the method includes:
  obtaining a virtual interrupt; and
  obtaining a corresponding physical interrupt identifier based on the virtual interrupt, and transferring the physical interrupt identifier to the hardware layer, so that the hardware layer obtains, based on the physical interrupt identifier, a corresponding virtual interrupt identifier and a corresponding virtual processor identifier, where the virtual interrupt is configured to interrupt a target virtual processor, the virtual interrupt and the physical interrupt identifier uniquely correspond to the virtual processor identifier, and the virtual processor identifier indicates the target virtual processor; and transferring the virtual interrupt identifier to the target virtual processor.

In some embodiments, the virtual interrupt uniquely corresponds to the virtual interrupt identifier.

In some embodiments, the obtaining a corresponding physical interrupt identifier based on the virtual interrupt includes:
  obtaining, based on the virtual interrupt and a preconfigured first mapping relationship, the physical interrupt identifier corresponding to the virtual interrupt, where the first mapping relationship indicates a plurality of virtual interrupts and a correspondence between each virtual interrupt and a physical interrupt identifier.

In some embodiments, the virtual interrupt includes a virtual device identifier and a virtual interrupt vector identifier; and
  the obtaining a corresponding physical interrupt identifier based on the virtual interrupt includes:
    obtaining, based on the virtual interrupt, a physical device identifier corresponding to the virtual device identifier and a physical interrupt vector identifier corresponding to the virtual interrupt vector identifier, where the physical interrupt identifier includes the physical device identifier and the physical interrupt vector identifier.

In some embodiments, the method further includes:
  obtaining interrupt state information corresponding to the physical interrupt identifier from the hardware layer in a virtual machine live migration process, where the interrupt state information indicates whether the virtual interrupt identifier corresponding to the physical interrupt identifier can be transferred to the virtual processor, and the interrupt state information may include at least one of the following: an interrupt pending state, an interrupt priority state, and an interrupt enable state; and
  writing the interrupt state information into a hardware layer of a computing device other than the computing device.

In some embodiments, the present disclosure provides an interrupt handling method. The method is applied to a computing device, the computing device includes a hardware layer and a host machine running on the hardware layer, and the method includes:
  obtaining, by the hardware layer based on a physical interrupt identifier, a corresponding virtual interrupt identifier and a corresponding virtual processor identifier, where the physical interrupt identifier is a physical interrupt identifier that corresponds to a virtual interrupt and that is obtained by the host machine based on the virtual interrupt and sent to the hardware layer, the virtual interrupt is configured to interrupt a target virtual processor, the virtual interrupt and the physical interrupt identifier uniquely correspond to the virtual processor identifier, and the virtual processor identifier indicates the target virtual processor; and transferring the virtual interrupt identifier to the target virtual processor.

In some embodiments, the virtual interrupt uniquely corresponds to the virtual interrupt identifier.

In some embodiments, the computing device includes a physical interrupt translation service ITS and a physical generic interrupt controller GIC that are implemented based on the hardware layer.

The obtaining, by the hardware layer based on the physical interrupt identifier, a corresponding virtual interrupt identifier and a corresponding virtual processor identifier includes:
  obtaining, by the physical ITS based on the physical interrupt identifier, the corresponding virtual interrupt identifier and the corresponding virtual processor identifier.

The transferring the virtual interrupt identifier to the target virtual processor includes:
  transferring, by the physical GIC, the virtual interrupt identifier to the target virtual processor.

In some embodiments, the obtaining, by the hardware layer based on the physical interrupt identifier, a corresponding virtual interrupt identifier includes: obtaining, by the hardware layer based on the physical interrupt identifier and a preconfigured second mapping relationship, the virtual interrupt identifier corresponding to the physical interrupt, where the second mapping relationship indicates a plurality of physical interrupt identifiers and a correspondence between each physical interrupt identifier and a virtual interrupt identifier.

In some embodiments, the method further includes:
obtaining, based on the physical interrupt identifier and a preconfigured third mapping relationship, the corresponding virtual processor identifier, where the third mapping relationship indicates a plurality of physical interrupt identifiers and a correspondence between each physical interrupt identifier and a virtual processor identifier.

In some embodiments, the obtaining, by the hardware layer based on the physical interrupt identifier, a corresponding virtual interrupt identifier and a corresponding virtual processor identifier includes: generating, by the hardware layer, a physical interrupt based on the physical interrupt identifier; and
obtaining the virtual interrupt identifier and the virtual processor identifier based on the physical interrupt.

In some embodiments, the method further includes:
obtaining, by the hardware layer, interrupt state information corresponding to the physical interrupt identifier, where the interrupt state information indicates whether the virtual interrupt identifier corresponding to the physical interrupt identifier can be transferred to the virtual processor; and determining, based on the interrupt state information, that the virtual interrupt identifier can be transferred to the virtual processor.

In some embodiments, the method further includes: obtaining, by the host machine, the interrupt state information corresponding to the physical interrupt identifier from the hardware layer in a virtual machine live migration process, where the interrupt state information indicates whether the virtual interrupt identifier corresponding to the physical interrupt identifier can be transferred to the virtual processor; and writing the interrupt state information into a hardware layer of a computing device other than the computing device.

In some embodiments, the present disclosure provides an interrupt handling apparatus. The apparatus includes:
a virtual interrupt handling unit, configured to obtain a virtual interrupt, obtain a corresponding physical interrupt identifier based on the virtual interrupt, and transfer the physical interrupt identifier to a hardware layer; and
a physical interrupt handling unit, configured to obtain, based on the physical interrupt identifier, a corresponding virtual interrupt identifier and a corresponding virtual processor identifier, where the virtual interrupt is configured to interrupt a target virtual processor, the virtual interrupt and the physical interrupt identifier uniquely correspond to the virtual processor identifier, and the virtual processor identifier indicates the target virtual processor; and transfer the virtual interrupt identifier to the target virtual processor.

The interrupt handling apparatus may be used in a computing device. The computing device includes the hardware layer and a host machine running on the hardware layer. The interrupt handling apparatus includes the virtual interrupt handling unit deployed on the host machine and the physical interrupt handling unit deployed on the hardware layer.

In some embodiments, the virtual interrupt uniquely corresponds to the virtual interrupt identifier.

In some embodiments, the computing device includes a physical interrupt translation service ITS and a physical generic interrupt controller GIC that are implemented based on the hardware layer.

The physical ITS is configured to obtain, based on the physical interrupt identifier, the corresponding virtual interrupt identifier and the corresponding virtual processor identifier.

The physical GIC is configured to transfer the virtual interrupt identifier to the target virtual processor.

In some embodiments, the virtual interrupt handling unit is further configured to obtain, based on the virtual interrupt and a preconfigured first mapping relationship, the physical interrupt identifier corresponding to the virtual interrupt, where the first mapping relationship indicates a plurality of virtual interrupts and a correspondence between each virtual interrupt and a physical interrupt identifier.

The physical interrupt handling unit is further configured to obtain, based on the physical interrupt identifier and a preconfigured second mapping relationship, the virtual interrupt identifier corresponding to the physical interrupt, where the second mapping relationship indicates a plurality of physical interrupt identifiers and a correspondence between each physical interrupt identifier and a virtual interrupt identifier.

In some embodiments, the physical interrupt handling unit is further configured to: obtain, based on the physical interrupt identifier and a preconfigured third mapping relationship, the corresponding virtual processor identifier, where the third mapping relationship indicates a plurality of physical interrupt identifiers and a correspondence between each physical interrupt identifier and a virtual processor identifier.

In some embodiments, the physical interrupt handling unit is further configured to generate a physical interrupt based on the physical interrupt identifier; and
obtain the virtual interrupt identifier and the virtual processor identifier based on the physical interrupt.

In some embodiments, the virtual interrupt includes a virtual device identifier and a virtual interrupt vector identifier; and
the virtual interrupt handling unit is further configured to obtain, based on the virtual interrupt, a physical device identifier corresponding to the virtual device identifier and a physical interrupt vector identifier corresponding to the virtual interrupt vector identifier, where the physical interrupt identifier includes the physical device identifier and the physical interrupt vector identifier.

In some embodiments, the physical interrupt handling unit is further configured to: obtain interrupt state information corresponding to the physical interrupt identifier, where the interrupt state information indicates whether the virtual interrupt identifier corresponding to the physical interrupt identifier can be transferred to the virtual processor; and determine, based on the interrupt state information, that the virtual interrupt identifier can be transferred to the virtual processor.

In some embodiments, the virtual interrupt handling unit is further configured to:
obtain the interrupt state information corresponding to the physical interrupt identifier from the hardware layer in a virtual machine live migration process, where the interrupt state information indicates whether the virtual interrupt identifier corresponding to the physical interrupt identifier can be transferred to the virtual processor; and write the interrupt state information into a hardware layer of a computing device other than the computing device.

In some embodiments, the present disclosure provides a computing device. The computing device includes a processor and a memory that are connected through a bus. In some embodiments, the processor may invoke code in the memory to implement any optional interrupt handling method.

In some embodiments, the present disclosure provides a computing device. The computing device includes a hardware layer and a host machine running on the hardware layer. The host machine is configured to: obtain a virtual interrupt, obtain a corresponding physical interrupt identifier based on the virtual interrupt, and transfer the physical interrupt identifier to the hardware layer. The hardware layer is configured to: obtain, based on the physical interrupt identifier, a corresponding virtual interrupt identifier and a corresponding virtual processor identifier, where the virtual interrupt is configured to interrupt a target virtual processor, the virtual interrupt and the physical interrupt identifier uniquely correspond to the virtual processor identifier, and the virtual processor identifier indicates the target virtual processor; and transfer the virtual interrupt identifier to the target virtual processor. In the foregoing manner, the virtual interrupt obtained by the host machine is mapped to a physical interrupt of a physical layer, and the virtual interrupt identifier is transferred to the virtual processor by using the physical layer. When the hardware layer transparently transmits the virtual interrupt identifier to the virtual processor, the virtual processor does not need to exit. This decreases a delay caused by exit of the virtual processor when software implements virtual interrupt routing.

DESCRIPTION OF EMBODIMENTS

The following describes embodiments of the present disclosure with reference to the accompanying drawings. It is clear that the described embodiments are merely some but not all of embodiments of the present disclosure. Persons of ordinary skill in the art may learn that, with technology development and emergence of a new scenario, the technical solutions provided in embodiments of the present disclosure are also applicable to a similar technical problem.

In the specification, claims, and accompanying drawings of the present disclosure, the terms "first", "second", and the like are intended to distinguish between similar objects but do not necessarily indicate a particular order or sequence. It should be understood that the data termed in such a way are interchangeable in proper circumstances, so that embodiments of the present disclosure described herein can be implemented in other orders than the order illustrated or described herein. In addition, the terms "include", "have", and any other variant thereof are intended to cover a non-exclusive inclusion. For example, a process, method, system, product, or device that includes a list of steps or modules is not necessarily limited to those steps or modules that are expressly listed, but may include other steps or modules that are not expressly listed or are inherent to the process, method, product, or device. Names or numbers of steps in the present disclosure do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved.

In addition, in the descriptions of the present disclosure, unless otherwise stated, "a plurality of" means two or more than two. The term "and/or" in the present disclosure describes only an association relationship for describing associated objects and represents that three relationships may exist. For example, A and/or B or A/B may represent the following three cases: Only A exists, both A and B exist, and only B exists.

Figure 1:
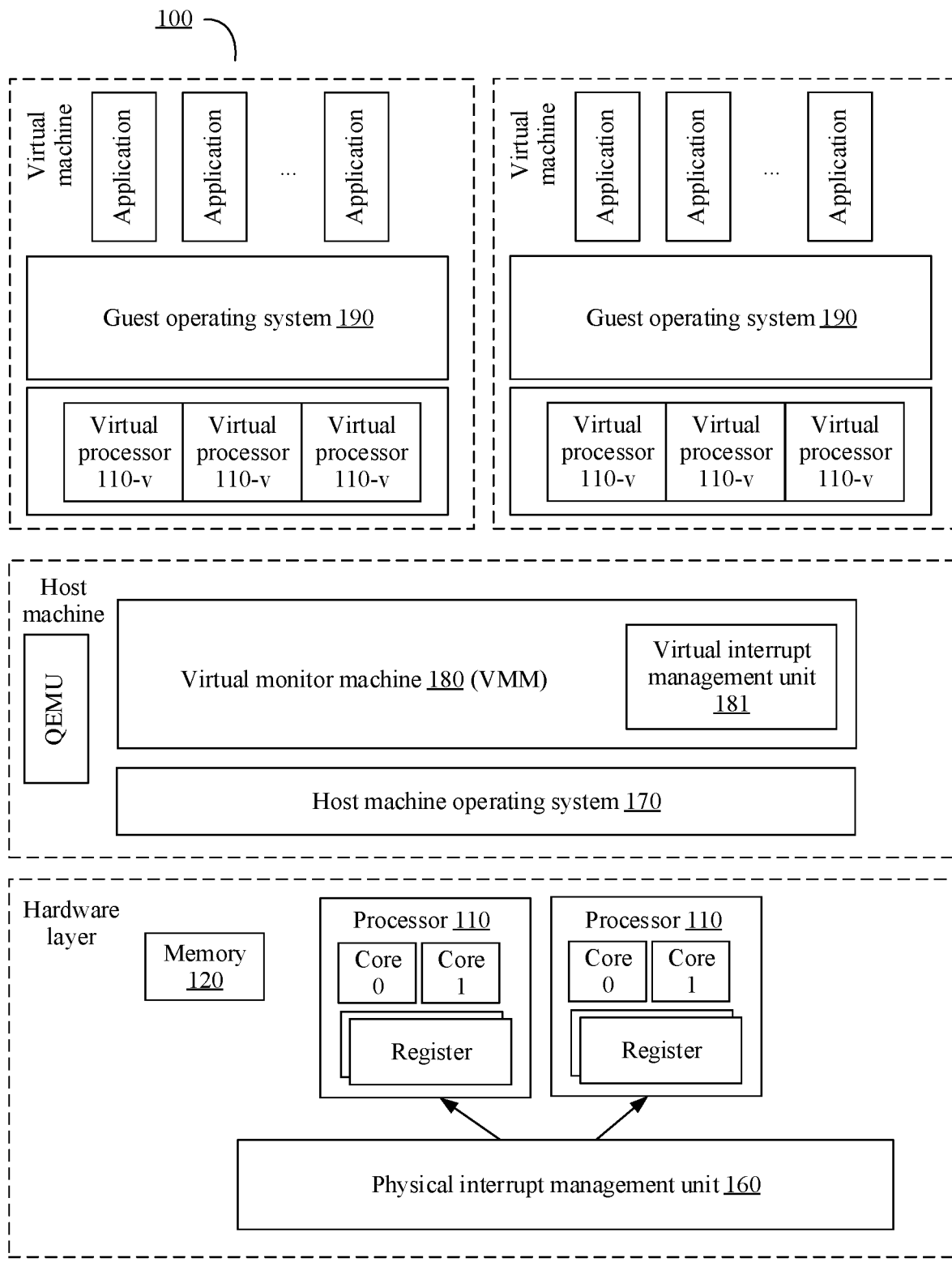
FIG. 1 is a schematic diagram of an architecture of a computing node according to some embodiments of the present disclosure.

To facilitate understanding of embodiments of the present disclosure, a computing node 100 shown in FIG. 1 is first used as an example to describe some basic concepts in the virtualization field in the present disclosure. The computing node 100 may be the computing device in embodiments of the present disclosure.

Virtualization is to virtualize a hardware resource (for example, storage space and network resources in a processor and a memory) at a hardware layer of a computing node, and then share a virtualized hardware resource with a plurality of virtual computers for use. The virtual computer is a general term of running environments virtualized through software in all types of computing devices, and the virtual computer includes a virtual machine and a container.

As shown in FIG. 1, the computing node 100 may include a hardware layer, a host machine layer, and a virtualization layer; and the virtualization layer includes two virtual machines. The hardware layer includes hardware such as two processors 110, a memory 120, and a physical interrupt management unit 160. In another embodiment, there may be more or fewer processors 110 and virtual machines.

One or more virtual machines (VMs) are obtained through simulation on a physical computer through software. These virtual machines run in a completely isolated environment and operate like real computers. A guest operating system (guest OS) may be installed on the virtual machine, and one or more applications run on the guest operating system. The virtual machine can also access network resources. The application running on the virtual machine operates like that on the real computer.

A virtual processor (for example, 110-v in FIG. 1) is a representation of a physical processing unit provided for a virtual computer in a sharing or slicing manner in the virtualization technology, for example, a virtual central processing unit (vCPU). One virtual computer may have one or more virtual processors serving the virtual computer. When there are the plurality of virtual processors, one virtual processor is usually a primary virtual processor, and the others are secondary virtual processors.

A host machine operating system 170 and a VMM 180 are deployed in a host machine, and the VMM 180 is equivalent to a hypervisor or another type of virtual monitoring apparatus in another virtualization architecture. The VMM 180 may be deployed in the host machine operating system 170, or may be separately deployed from the host machine operating system 170. The VMM 180 is responsible for managing one or more virtual machines running on the VMM 180.

The virtual machine (VM) includes a virtual hardware layer, the guest operating system 190, and a plurality of applications. The virtual hardware layer includes virtual hardware such as a virtual memory (not shown in the figure) and the virtual processor 110-v. As shown in FIG. 1, this embodiment includes two virtual machines, and each virtual machine includes three virtual processors 110-v. The virtual processor 110-v is implemented by combining software and hardware. Running of the virtual processor 110-v is actually implemented by reading and running a software program by a physical core. For example, one physical core reads the software program and runs the software program in a mode of hardware-assisted virtualization of the physical core to implement the virtual processor 110-v. Therefore, the virtual processor 110-v needs to be scheduled to a physical core.

The virtual processor 110-v may be bound to the physical core. In some embodiments, one virtual processor 110-v is fixedly run on a physical core and cannot be scheduled to run on another physical core. In this case, the virtual processor is core-binding. If one virtual processor 110-v may be scheduled to run on different physical cores according to a requirement, the virtual processor is non-core-binding.

A total quantity of virtual processors 110-v shown in FIG. 1 is 6, which is greater than a quantity of physical cores 4. This scenario is referred to as physical processor overcommitment. In a case of physical processor overcommitment, a plurality of virtual processors may share a same physical core in a time slicing manner or in another manner. Such a physical core is referred to as a non-exclusive core. Certainly, the non-exclusive core may also occur in a case of non-overcommitment. If a physical core is bound to a virtual processor and is not shared by other virtual processors, the physical core is an exclusive core.

It should be understood that the virtual machine is equivalent to an independent computer, and it may also be considered that an action performed by the virtual machine is performed by a virtual processor. However, the virtual processor is implemented through software. Therefore, the action performed by the virtual processor is actually performed by a physical processor or a physical core running by the virtual processor. In a plurality of embodiments of the present disclosure, to comply with a technical expression habit of a current scenario, the foregoing expression manners are selectively used.

The virtual machine can include a container, and the container is equivalent to an application. In some other embodiments, the virtualization layer is implemented by using the lightweight virtualization technology, for example, library Operation System (libOS) 190. One libOS usually includes one application. The entire libOS includes one or more libraries, which are linked to the application to form a single-address space image. In embodiments of the present disclosure, a virtual machine implemented by using the conventional virtualization technology is usually used as an example. For another type of virtualization architecture, refer to embodiments of the virtual machine.

As a management layer, the host machine is configured to manage and allocate hardware resources, present a virtual hardware platform for a virtual machine, implement scheduling and isolation of the virtual machine, and the like. In some embodiments, the host machine layer includes the host machine operating system and a virtual monitoring apparatus, for example, the virtual machine monitor (VMM) or a hypervisor. The virtual monitoring apparatus may be deployed in the host machine operating system, or may be deployed outside the host machine operating system. In some embodiments, the "host machine layer" may further include one privileged virtual machine (for example, a virtualization architecture Xen). The virtual hardware platform provides various hardware resources, such as a virtual processor, a virtual memory, a virtual disk, and a virtual network interface card, for each virtual computer running on the virtual hardware platform. The virtual computer runs on a virtual hardware platform prepared by the host machine layer for the virtual computer. In the present disclosure, the host machine layer is sometimes referred to as the host machine for short.

The host machine may further include a back-end driver (for example, software such as open-source QEMU), configured to: simulate a virtual disk with a cache for the virtual machine, including parsing a cache configuration and a cache policy set by a user, for example, a cache size, a cache type, and a cache priority; simulate a virtual disk with a virtual machine cache that meets a user configuration for the virtual machine; provides simulation of a first physical address required by a front-end driver; and is responsible for management operations related to cache attribute modification in virtualization management, for example, initiating tasks such as online cache capacity expansion and reduction. The back-end driver can obtain a virtual interrupt enabling behavior of the virtual machine, trigger the corresponding virtual interrupt, and transfer the virtual interrupt to the VMM.

It should be understood that the QEMU included in the host machine shown in FIG. 1 is merely an example. In an actual application, the host machine may further include another type of back-end driver.

As a virtual monitoring apparatus, the VMM 180 is responsible for scheduling the virtual processors 110-v of each virtual machine VM. For example, a kernel-based virtual machine (KVM) is a typical VMM.

A virtual interrupt management unit 181 is deployed at the host machine layer. When the VMM 180 is deployed on the host machine operating system 170, the virtual interrupt management unit 181 may be deployed in the host machine operating system 170, or may be deployed in the VMM 180; or may be partially deployed in the host machine operating system 170 and partially deployed in the VMM 180. When the VMM 180 is deployed in the host machine operating system 170, the virtual interrupt management unit 181 may be deployed in the VMM 180; or may be deployed in space of the host machine operating system 170 other than the VMM 180; or may be partially deployed in the VMM 180, and partially deployed in space of the host machine operating system 170 other than the VMM 180.

The virtual interrupt management unit 181 may implement steps related to the host machine in the interrupt handling method in embodiments of the present disclosure.

The hardware layer is a hardware platform in which a virtualization environment runs. The hardware layer may include a plurality of types of hardware. For example, a hardware layer of a physical computer may include a processor and a memory, and may further include an interrupt controller, a network interface card (NIC), an input/output (I/O) device, and the like.

The processor 110 may also be referred to as a physical processor. A physical core represents a minimum processing unit in a processor. As shown in FIG. 1, the processor in this embodiment may have two physical cores, namely, a core 0 and a core 1, and a plurality of registers. In some other embodiments, the processor may include more or fewer cores, and the processors may include different quantities of cores. A processor with a plurality of physical cores is called a multi-core processor. Based on a kernel architecture, the processors can be classified into a processor with a same architecture and a plurality of cores and a processor with different architectures and a plurality of cores. The virtual processor may be bound to the physical core. In some embodiments, a virtual processor is fixedly run on a physical core and cannot be scheduled to run on another physical core. In this case, the virtual processor is core-binding. If one virtual processor may be scheduled to run on different physical cores according to a requirement, the virtual processor is a non-core binding.

The physical interrupt management unit 160 is responsible for collecting physical interrupt requests (which may also be referred to as physical interrupts), and sending these physical interrupt requests to each processor 110 or transparently transmitting these physical interrupt requests to a virtual processor on each processor according to a rule. It should be noted that the physical interrupt management unit 160 may perform some steps related to the hardware layer in the interrupt handling method in the present disclosure.

It should be noted that an interrupt is an event generated by software or hardware, and the interrupt includes a virtual interrupt and a physical interrupt. The physical interrupt is an event generated by hardware. The hardware sends the event to a processor. When receiving the event, the processor temporarily stops execution of a current program and executes a program corresponding to the event. An interrupt request generated by the hardware may be triggered by the hardware or triggered by the software. Some hardware (such as a network adapter, an audio adapter, a mouse, and a hard disk) in a computer can complete work without intervention of the processor. However, these hardware still needs to periodically interrupt the processor, so that the processor performs some work for the hardware.

In a virtualized environment, the VMM needs to present, to the virtual machine, a virtual interrupt architecture similar to a physical interrupt architecture. In this case, the physical interrupt corresponds to the virtual interrupt (which may also be referred to as a virtualization interrupt); and the virtual interrupt may be enabled by a front-end driver in the virtual machine, and is obtained and triggered by the back-end driver (for example, the QEMU) in the host machine.

An interrupt controller is disposed between hardware that triggers an interrupt request and a processor, is mainly configured to collect an interrupt generated by each hardware, and send the interrupt to the processor based on a priority or another rule.

Interrupt affinity means a correspondence between an interrupt and a processing entity (which may be a physical processing entity or a virtual processing entity, for example, a physical core) that processes the interrupt request. The interrupt controller may send, based on the interrupt affinity, an interrupt request to one or more physical processing entities corresponding to the interrupt request.

Figure 2A:
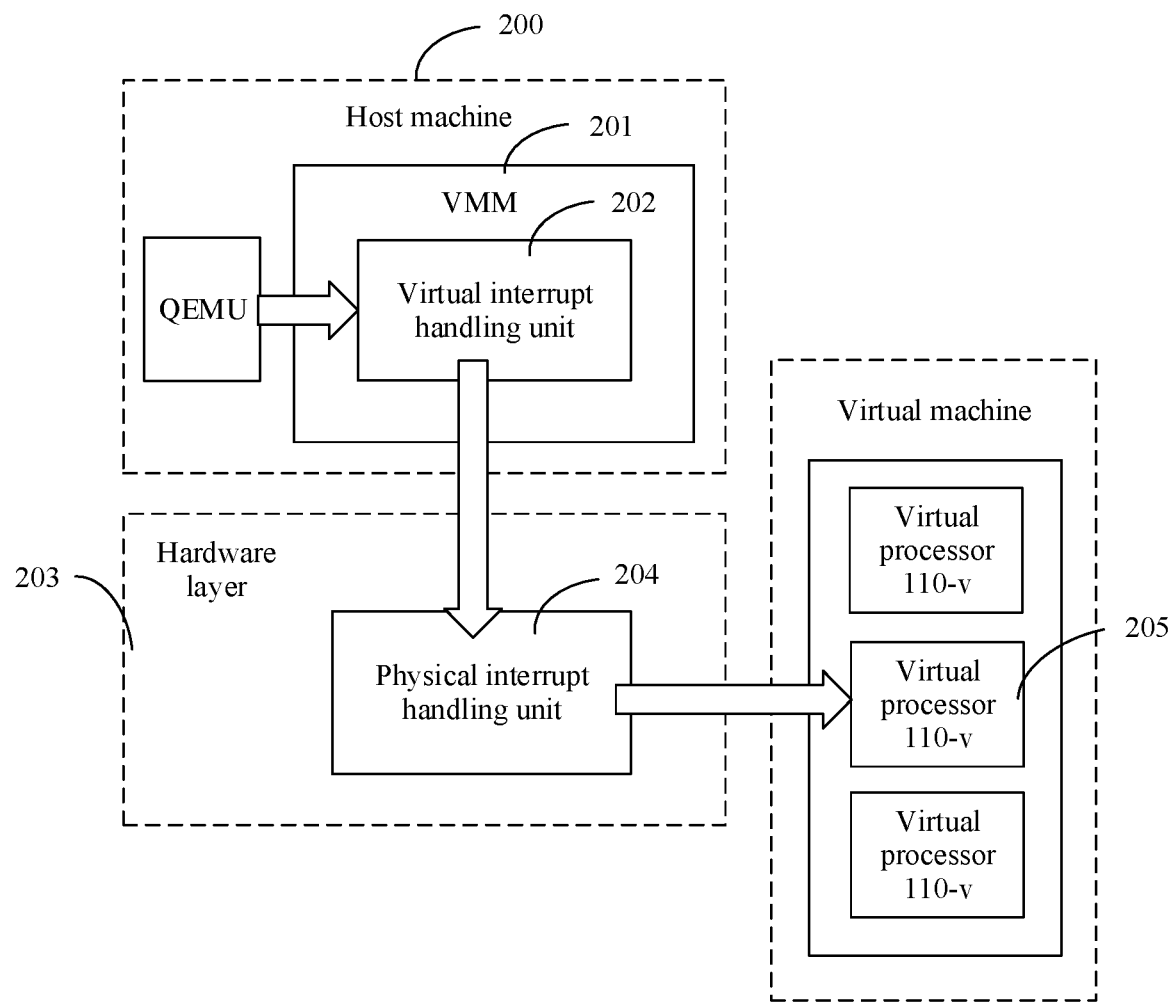
FIG. 2a is a schematic diagram of a computing device according to some embodiments of the present disclosure.

FIG. 2a shows a computing device according to some embodiments of the present disclosure. As shown in FIG. 2a, the computing device includes a host machine 200 and a hardware layer 203.

In this embodiment of the present disclosure, a virtual device in a virtual machine may enable a virtual interrupt, and the virtual device may be a virtual device simulated through software, for example, a serial port simulated through software. A back-end driver (for example, a QEMU) in the host machine may obtain a behavior of enabling the virtual interrupt by the virtual machine, and trigger the virtual interrupt. The virtual interrupt may include a virtual device identifier device ID and a virtual interrupt vector identifier vector ID. When an interrupt resource is initialized, the virtual device identifier device ID and the virtual interrupt vector identifier vector ID are allocated to a virtual processor of the virtual machine. Each virtual processor uniquely corresponds to one virtual device identifier device ID and a plurality of virtual interrupt vector identifiers vector IDs. The virtual device identifier device ID in the virtual interrupt may indicate which virtual device enables the virtual interrupt, and the virtual interrupt vector identifier vector ID may indicate a virtual interrupt in a plurality of virtual interrupts allocated by the virtual device.

After triggering the virtual interrupt, the back-end driver (for example, the QEMU) may transfer the virtual interrupt to a VMM. Correspondingly, the VMM in the host machine 200 may obtain the virtual interrupt.

In this embodiment of the present disclosure, the VMM in the host machine may obtain the virtual interrupt, obtain a corresponding physical interrupt identifier based on the virtual interrupt, and transfer the physical interrupt identifier to the hardware layer 203. For details, refer to FIG. 2b that shows more details.

To transparently transmit, by using the hardware layer, the virtual interrupt obtained by the VMM to the corresponding virtual processor, the virtual interrupt needs to be converted into a physical interrupt that can be identified and processed by the hardware layer.

Paragraph 99:

In some embodiments, the hardware layer may include a physical interrupt translation service (ITS) and a physical generic interrupt controller (GIC). The physical ITS may obtain a physical interrupt, and the physical interrupt is used to interrupt a virtual CPU. The physical ITS may determine a virtual CPU corresponding to the physical interrupt, and determine a virtual interrupt identifier (indicates a virtual interrupt) corresponding to the physical interrupt. The physical GIC may send the virtual interrupt identifier to the virtual CPU (e.g., virtual processor 110-v (205)).

The following describes how the VMM converts the virtual interrupt into the physical interrupt that can be identified and processed by the hardware layer. This can ensure that the virtual processor can receive a correct virtual interrupt identifier.

From the perspective of a virtual interrupt transfer process implemented through software, after obtaining the virtual interrupt (including the virtual device identifier device ID and the virtual interrupt vector identifier vector ID), the VMM may determine, based on the physical ITS, a virtual interrupt identifier and a virtual processor identifier that correspond to the virtual interrupt. It should be noted that the virtual interrupt identifier herein may be different from the virtual device identifier device ID and the virtual interrupt vector identifier vector ID. GICv4 specified in the ARM architecture standard is used as an example, and the virtual interrupt identifier is vINTID. The virtual processor identifier uniquely indicates a target virtual processor.

To transparently transmit the virtual interrupt obtained by the VMM to the corresponding virtual processor by using the hardware layer, and ensure that the virtual processor can receive the correct virtual interrupt identifier, a new mapping relationship (which may be referred to as a first mapping relationship below) needs to be preconfigured on the VMM, and a new mapping relationship (which may be referred to as a second mapping relationship and a third mapping relationship below) is adaptively configured on the hardware layer. The mapping relationship configured on the VMM and the mapping relationship configured on the hardware layer may be mutually configured, so that the VMM may convert, based on the first mapping relationship, the obtained virtual interrupt (including the virtual device identifier device ID and the virtual interrupt vector identifier vector ID) into the physical interrupt identifier (for example, including the physical device identifier device ID and the physical interrupt vector identifier vector ID) that can be identified by the hardware layer (for example, the physical ITS). In addition, the hardware layer may determine, based on the preconfigured second mapping relationship, the virtual interrupt identifier corresponding to the physical interrupt identifier, and determine, based on the preconfigured third mapping relationship, the virtual processor identifier corresponding to the physical interrupt identifier. The virtual processor identifier uniquely corresponds to the target virtual processor.

To ensure that the virtual processor can receive the correct virtual interrupt identifier, the virtual interrupt identifier determined by the hardware layer based on the preconfigured second mapping relationship needs to be consistent with a virtual interrupt identifier corresponding to a virtual interrupt determined by the VMM in virtual interrupt transfer implemented through software. In addition, the virtual processor identifier determined by the hardware layer based on the preconfigured third mapping relationship needs to be consistent with a virtual processor identifier corresponding to the virtual interrupt determined by the VMM in the virtual interrupt transfer implemented through software. In some embodiments, when the virtual interrupt transfer is implemented through software, the VMM may determine B (the virtual interrupt identifier) and C (the virtual processor identifier) based on A (the virtual interrupt), in a solution of transparently transmitting, by using the hardware layer, the virtual interrupt obtained by the VMM to the corresponding virtual processor, the VMM may determine D (the physical interrupt identifier) based on A (the virtual interrupt), and the physical layer may determine B (the virtual interrupt identifier) and C (the virtual processor identifier) based on D (the physical interrupt identifier).

In some embodiments, to implement the foregoing process, on the VMM, an abstraction of a corresponding physical device may be preconfigured for each virtual device. The abstraction is referred to as an abstraction of the physical device because the physical device may not actually exist, only an interrupt resource allocated by the physical device is stored in the VMM, and the interrupt resource may include a physical interrupt identifier. In this embodiment, the VMM may pre-store a physical interrupt identifier corresponding to each of a plurality of virtual interrupts corresponding to the virtual device. For example, the virtual interrupt may include the virtual device identifier device ID and the virtual interrupt vector identifier vector ID, and the VMM may obtain a physical device identifier device ID corresponding to the virtual device identifier device ID and a physical interrupt vector identifier vector ID corresponding to the virtual interrupt vector identifier vector ID.

In some embodiments, the VMM may maintain the preconfigured first mapping relationship. The first mapping relationship may include a mapping relationship between the virtual interrupt and the physical interrupt identifier. The VMM may obtain, based on the first mapping relationship, the physical interrupt identifier corresponding to the virtual interrupt. In some embodiments, the first mapping relationship may include two tables (Table 1 and Table 2). Table 1 includes a plurality of virtual device identifiers device IDs and a pointer corresponding to each virtual device identifier device ID. The VMM may find Table 2 corresponding to the virtual device identifier device ID by using the pointer. Table 2 may include a plurality of virtual interrupt vector identifiers vector IDs corresponding to the virtual device identifier device ID, and a physical interrupt vector identifier vector ID corresponding to each virtual interrupt vector identifier vector ID. In the foregoing manner, the VMM may determine the physical interrupt identifier corresponding to the virtual interrupt.

After the VMM obtains the physical interrupt identifier corresponding to the virtual interrupt, the host machine may transfer the physical interrupt identifier to the hardware layer. In some embodiments, the host machine may transfer the physical interrupt identifier to the physical ITS on the hardware layer.

The physical ITS on the hardware layer may obtain, based on the physical interrupt identifier, the corresponding virtual interrupt identifier and the corresponding virtual processor identifier, where the virtual interrupt identifier uniquely indicates the virtual interrupt, and the virtual processor identifier indicates the target virtual processor. The physical GIC on the hardware layer may transfer the virtual interrupt identifier to the target virtual processor corresponding to the virtual processor identifier.

In some embodiments, the hardware layer may further generate a physical interrupt based on the physical interrupt identifier.

In this embodiment of the present disclosure, the host machine may further transfer an interrupt generation request that carries the physical interrupt identifier to the hardware layer, and the hardware layer may generate the physical interrupt based on the interrupt generation request.

In some embodiments, the host machine may transfer the interrupt generation request that carries the physical interrupt identifier to the physical ITS on the hardware layer, and the physical ITS may generate the corresponding physical interrupt based on the interrupt generation request that carries the physical interrupt identifier.

In some embodiments, the host machine may write the physical interrupt identifier into a target register located on the hardware layer, so that the target register generates the physical interrupt.

In this embodiment of the present disclosure, the host machine may write the physical interrupt identifier into the target register located on the hardware layer. The target register has a capability of generating the physical interrupt through software, and the physical ITS may obtain the physical interrupt from the target register.

In this embodiment of the present disclosure, the hardware layer may obtain the corresponding virtual interrupt identifier based on the physical interrupt identifier and the preconfigured second mapping relationship.

In some embodiments, the physical ITS on the hardware layer may maintain a preconfigured mapping relationship, where the mapping relationship may include a mapping relationship among the physical interrupt identifier, the virtual interrupt identifier, and the virtual processor identifier. In some embodiments, the hardware layer may maintain the second mapping relationship, where the second mapping relationship includes a mapping relationship between the physical interrupt identifier and the virtual interrupt identifier. The hardware layer may obtain, based on the second mapping relationship, the virtual interrupt identifier corresponding to the physical interrupt identifier. The hardware layer may maintain the third mapping relationship, where the third mapping relationship includes a mapping relationship between the physical interrupt identifier and the virtual processor identifier. The hardware layer may obtain, based on the third mapping relationship, the virtual processor identifier corresponding to the physical interrupt identifier, where the virtual processor identifier indicates the target virtual processor.

In this embodiment of the present disclosure, the second mapping relationship and the third mapping relationship may be set on the hardware layer in a pre-configuration process. Based on the second mapping relationship and the third mapping relationship, the hardware layer may determine the virtual processor identifier corresponding to the physical interrupt identifier obtained from the VMM, and determine the virtual interrupt identifier corresponding to the physical interrupt identifier. The virtual interrupt identifier (vINTID) may uniquely indicate the virtual interrupt. The hardware layer may transfer the virtual interrupt identifier to the target virtual processor.

The virtual interrupt is used to interrupt the corresponding target virtual processor. To ensure correctness of interrupt routing, the mapping relationship that is between the virtual interrupt and the physical interrupt identifier and that is maintained by the VMM and the mapping relationship that is between the physical interrupt identifier and the target virtual processor and that is maintained by the hardware layer may be combined, so that a target virtual processor finally determined by the hardware layer is the corresponding target virtual processor interrupted by the virtual interrupt. In addition to ensuring correctness of a route end point (the target virtual processor), correctness of content of the virtual interrupt also needs to be ensured. Therefore, the virtual interrupt identifier obtained by the hardware layer by mapping the physical interrupt identifier needs to uniquely indicate the virtual interrupt. In this way, it is equivalent that the target virtual processor receives the correct virtual interrupt identifier. The foregoing manner is consistent with an existing manner of implementing virtual interrupt routing through VMM software from a perspective of a virtual processor.

In this embodiment of the present disclosure, a routing table (the second mapping relationship and the third mapping relationship in the foregoing embodiment) of the physical ITS is defined in the GICv4 specification. One channel is opened for the virtual interrupt on the hardware layer, and the channel may transparently transmit the virtual interrupt from the hardware layer to the target virtual processor. When the hardware layer transparently transmits the virtual interrupt identifier to the target virtual processor, it is not required that the hardware layer writes the virtual interrupt identifier into a system register corresponding to the virtual processor, and then the virtual processor obtains the virtual interrupt identifier from the system register when the virtual processor runs again. Instead, the virtual interrupt identifier is directly transferred to the target virtual processor. Therefore, the target virtual processor does not need to exit. This decreases a delay caused by exit of the virtual processor when software implements virtual interrupt routing.

In some embodiments, the hardware layer is further configured to: obtain interrupt state information corresponding to the physical interrupt identifier, where the interrupt state information indicates whether the virtual interrupt identifier corresponding to the physical interrupt identifier can be transferred to the virtual processor, and the interrupt state information may include at least one of the following: interrupt pending information, an interrupt priority state, and an interrupt enable state; determine, based on the interrupt state information, that the virtual interrupt identifier can be transferred to the virtual processor. The interrupt pending information may indicate that the virtual interrupt is in a pending/active state, the interrupt priority state may indicate a priority of a current virtual interrupt in all to-be-processed virtual interrupts, and the interrupt enable state may indicate whether an interrupt can be transferred to a processor. In some embodiments, if the physical interrupt identifier is in an enabled state, and the priority state and the pending state meet conditions, the virtual interrupt identifier corresponding to the physical interrupt identifier can be transferred to the virtual processor.

In this embodiment of the present disclosure, a physical generic interrupt controller on the hardware layer may obtain the interrupt state information corresponding to the physical interrupt identifier, where the interrupt state information indicates whether the virtual interrupt identifier corresponding to the physical interrupt identifier can be transferred to the virtual processor, and the interrupt state information includes at least one of the following: the interrupt pending information, the interrupt priority state, and the interrupt enable state; and determine, based on the interrupt state information, that the virtual interrupt identifier can be transferred to the virtual processor. For more details, refer to related descriptions specified by a physical terminal controller at a physical layer in the ARM or another standard. Details are not described herein again.

Some embodiments of the present disclosure provide a computing device. The computing device includes a hardware layer and a host machine running on the hardware layer. The host machine is configured to: obtain a virtual interrupt, obtain a corresponding physical interrupt identifier based on the virtual interrupt, and transfer the physical interrupt identifier to the hardware layer. The hardware layer is configured to: obtain, based on the physical interrupt identifier, a corresponding virtual interrupt identifier and a corresponding virtual processor identifier, where the virtual interrupt is configured to interrupt a target virtual processor, the virtual interrupt and the physical interrupt identifier uniquely correspond to the virtual processor identifier, and the virtual processor identifier indicates the target virtual processor; and transfer the virtual interrupt identifier to the target virtual processor. In the foregoing manner, the virtual interrupt obtained by the host machine is mapped to a physical interrupt of a physical layer, and the virtual interrupt identifier is transferred to the virtual processor by using the physical layer. When the hardware layer transparently transmits the virtual interrupt identifier to the virtual processor, the virtual processor does not need to exit. This decreases a delay caused by exit of the virtual processor when software implements virtual interrupt routing.

Figure 3:
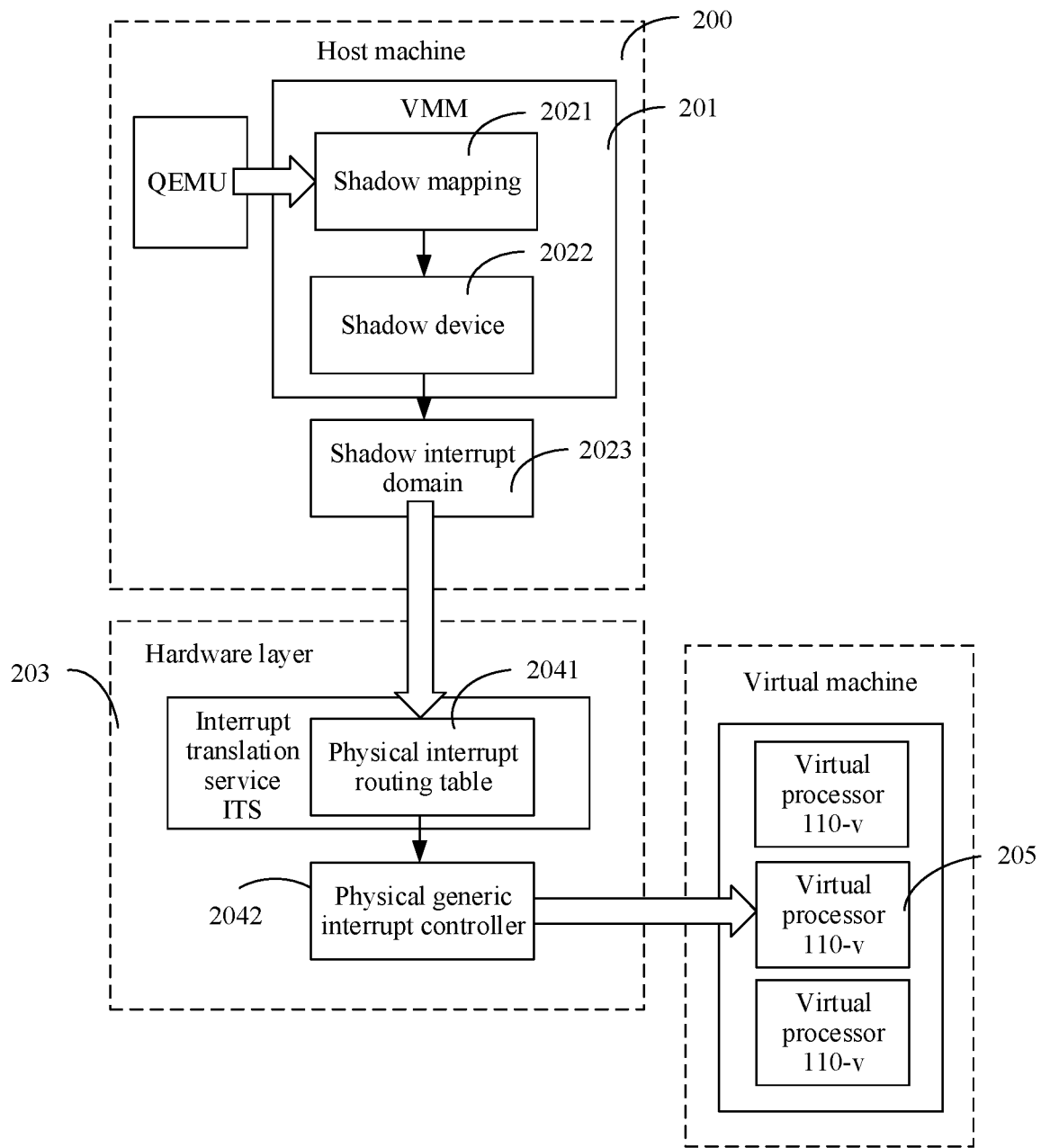
FIG. 3 is a schematic diagram of interrupt handling according to some embodiments of the present disclosure.

FIG. 3 shows an embodiment of the present disclosure. As shown in FIG. 3, a VMM may include shadow mapping 2021 and a shadow device 2022; and an interrupt system may include a shadow interrupt domain 2023. The shadow mapping 2021 and the shadow device 2022 may provide an abstraction of a "shadow object" for each virtual device of a virtual machine. A front-end driver (for example, a Virtual Input/Output (VirtIO) driver) in the virtual machine allocates several virtual interrupts to the virtual device. The shadow mapping 2021 and the shadow device 2022 are responsible for linking each virtual interrupt of the virtual device to one physical interrupt on a host. When the front-end driver of the virtual machine enables the virtual interrupt (in other words, when the virtual device triggers the interrupt), adjusts virtual interrupt routing (in other words, modifies a mapping relationship between the virtual interrupt and a virtual processor), modifies a virtual interrupt configuration (in other words, modifies a mapping relationship between the virtual interrupt and a virtual interrupt identifier), and the like, the VMM may intercept these operations, and synchronize interrupt information configured on the virtual machine (for example, including information related to enabling the virtual interrupt by the front-end driver, information related to adjusting the virtual interrupt routing, and information related to modifying the virtual interrupt configuration) to the corresponding shadow mapping 2021 and the corresponding shadow device 2022. In some embodiments, the shadow mapping 2021 may include key information registered by the virtual device, for example, a device identifier of the virtual device, a virtual interrupt vector identifier, an upper limit of a quantity of virtual interrupts that can be processed by the virtual processor, and virtual routing information of the virtual interrupt of the device, such as the virtual interrupt identifier and a virtual processor corresponding to each virtual interrupt.

The shadow device 2022 may apply for a physical interrupt resource such as a physical interrupt identifier on the host for each virtual device.

The shadow interrupt domain 2023 may transfer the physical interrupt identifier to a physical ITS of the physical layer.

As shown in FIG. 3, the physical ITS at a hardware layer may include a physical interrupt routing table 2041, and the hardware layer may include a physical generic interrupt controller 2042. The physical interrupt routing table 2041 may be a preconfigured mapping relationship, and the mapping relationship may include a mapping relationship among the physical interrupt identifier, the virtual interrupt identifier, and the virtual processor. In some embodiments, the hardware layer may maintain a second mapping relationship. The second mapping relationship may be a part of the physical interrupt routing table 2041. The second mapping relationship includes a mapping relationship between the physical interrupt identifier and the virtual interrupt identifier. The hardware layer may obtain, based on the second mapping relationship, the virtual interrupt identifier corresponding to the physical interrupt identifier. The hardware layer may maintain a third mapping relationship. The third mapping relationship may be a part of the physical interrupt routing table 2041. The third mapping relationship may include a mapping relationship between the physical interrupt identifier and the virtual processor. The hardware layer may obtain, based on the third mapping relationship, the virtual processor corresponding to the physical interrupt identifier.

The physical generic interrupt controller 2042 may obtain, based on a correspondence between the physical interrupt identifier and interrupt state information, the interrupt state information corresponding to the physical interrupt identifier; and determine, based on the interrupt state information, that the virtual interrupt identifier can be transferred to the virtual processor.

Figure 4:
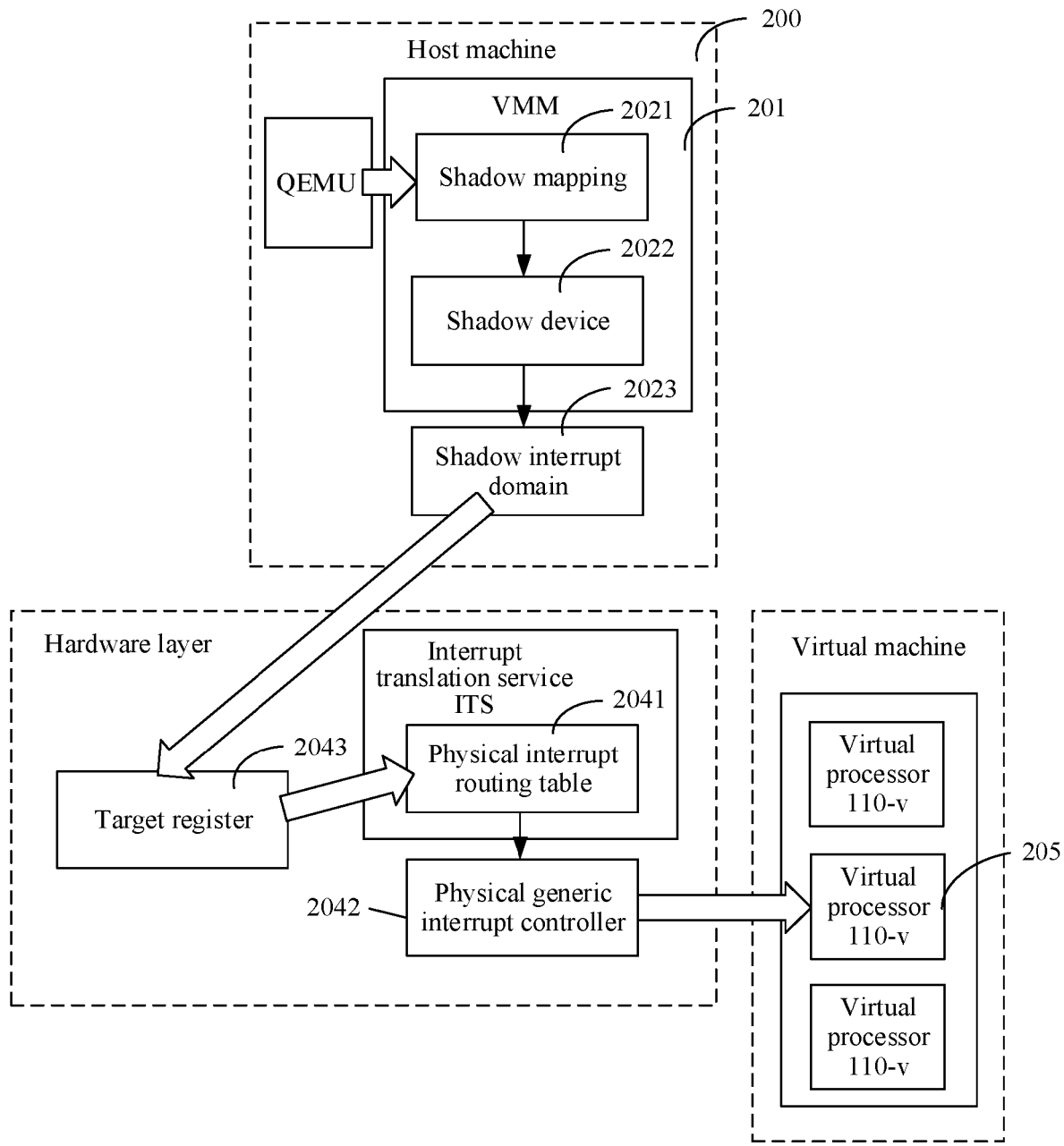
FIG. 4 is a schematic diagram of interrupt handling according to some embodiments of the present disclosure.

FIG. 4 shows more details than FIG. 3. As shown in FIG. 4, the VMM may write the physical interrupt identifier into a target register 2043 located on the hardware layer, so that the target register 2043 generates a physical interrupt. The target register may generate the physical interrupt through software, and the ITS may obtain the physical interrupt from the target register.

To implement the foregoing effect, the VMM and the hardware layer need to be preconfigured. In some embodiments, the virtual VirtIO device driver in the virtual machine is loaded and initialized, and the related operation is intercepted by the VMM, to establish a software routing table of the virtual interrupt. The virtual VirtIO device driver in the virtual machine enables a virtual device capability by writing peripheral component interconnect (PCI) standard configuration space. This writing operation is intercepted by the VMM. The VMM may register the key information (the device identifier of the virtual device, the virtual interrupt vector identifier, the upper limit of the quantity of virtual interrupts that can be processed by the virtual processor, and the like) of the virtual device with the VMM according to a protocol. The VMM creates one shadow object for the registered virtual device, creates a shadow device based on registered virtual device information, and applies for occupying physical host device identifiers and physical interrupt identifier resources. The applied physical interrupt identifier resource is registered with the shadow interrupt domain for management. The VMM may parse routing information of each virtual interrupt of the virtual device by using the registered virtual device, including information such as a target virtual interrupt routing device, a virtual interrupt identifier, and a target virtual processor. The shadow object parses the virtual interrupt routing relationship, translates and constructs a format of a physical interrupt routing device, and establishes a physical device interrupt routing table of the physical interrupt of the corresponding virtual device through management of the shadow interrupt domain by using the physical interrupt corresponding to the shadow device. The VMM parses routing information of each virtual interrupt of the virtual device by using the registered virtual device, including information such as the target virtual interrupt routing device, the virtual interrupt identifier, and the target virtual processor. Other attributes (such as enabling, priority, and affinity) of the virtual interrupt are translated by using the shadow object, and an interrupt configuration table of the shadow device is configured or modified through management of the shadow interrupt domain.

Figure 5:
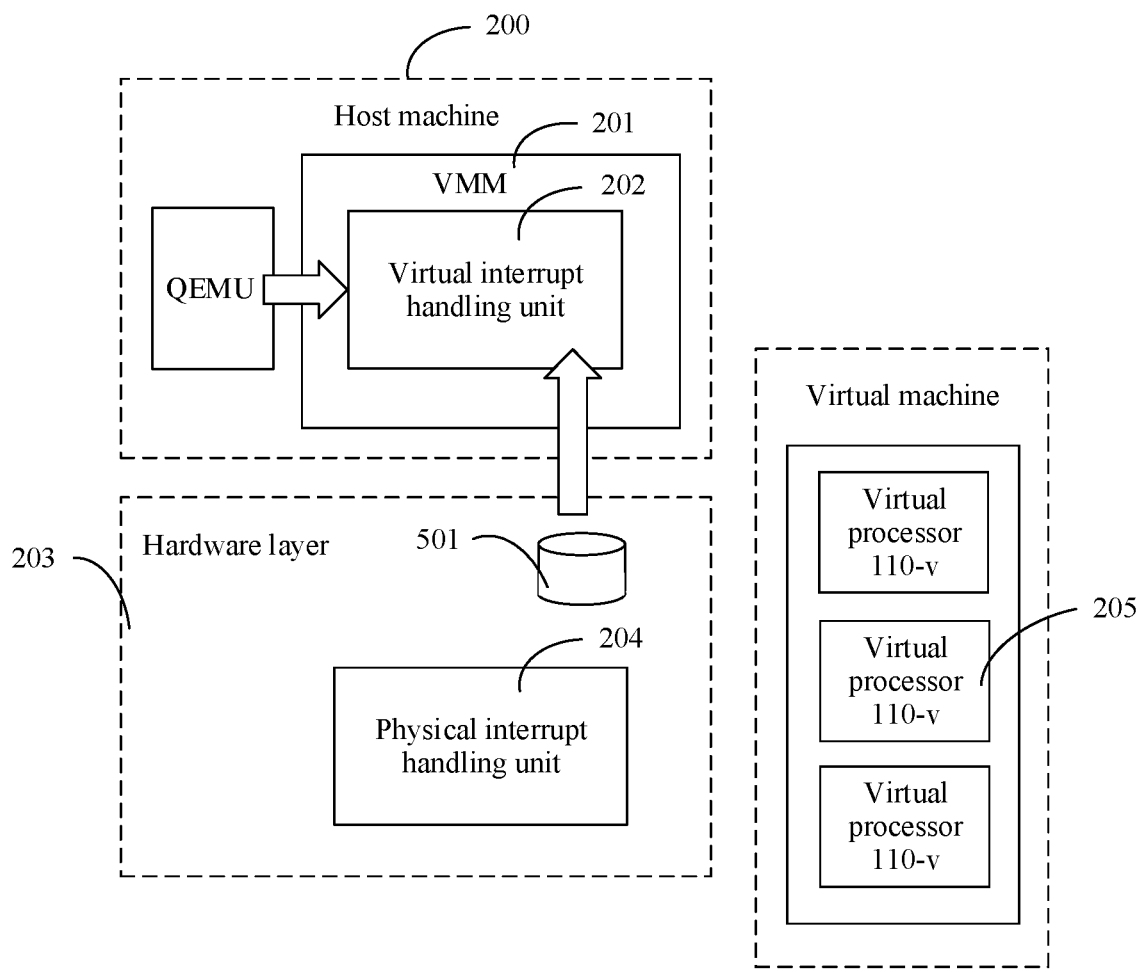
FIG. 5 is a schematic diagram of interrupt handling according to some embodiments of the present disclosure.

In some embodiments, the host machine may further obtain interrupt state information corresponding to the physical interrupt identifier from the hardware layer in a virtual machine live migration process, where the interrupt state information includes at least one of the following: interrupt pending information, an interrupt priority state, and an interrupt enable state; and write the interrupt state information into a hardware layer of a computing device other than the computing device. FIG. 5 shows an example of a computing device according to some embodiments of the present disclosure. As shown in FIG. 5, the interrupt state information may be stored in an area 501 that can be accessed by both the hardware layer and the VMM, so that the physical interrupt handling unit 204 on the hardware layer may obtain the interrupt state information, and determine, based on the interrupt state information, whether the virtual interrupt identifier needs to be transferred to the corresponding virtual processor. In addition, in the virtual machine live migration process, the VMM 201 may also obtain the interrupt state information corresponding to the physical interrupt identifier from the hardware layer, and write the interrupt state information into the hardware layer of the another computing device other than the computing device.

Figure 6:
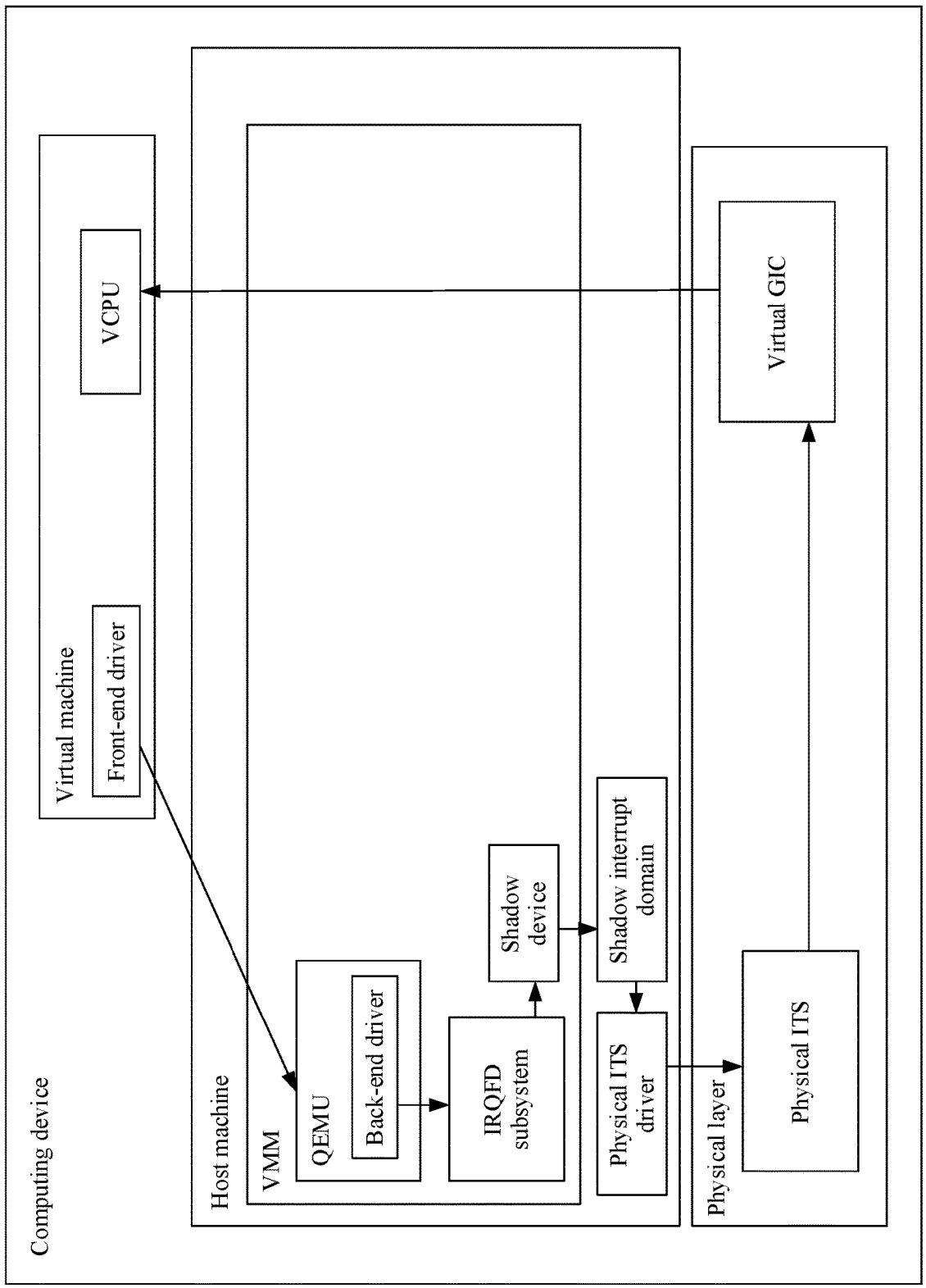
FIG. 6 is a schematic diagram of interrupt handling according to some embodiments of the present disclosure.
Figure 7:
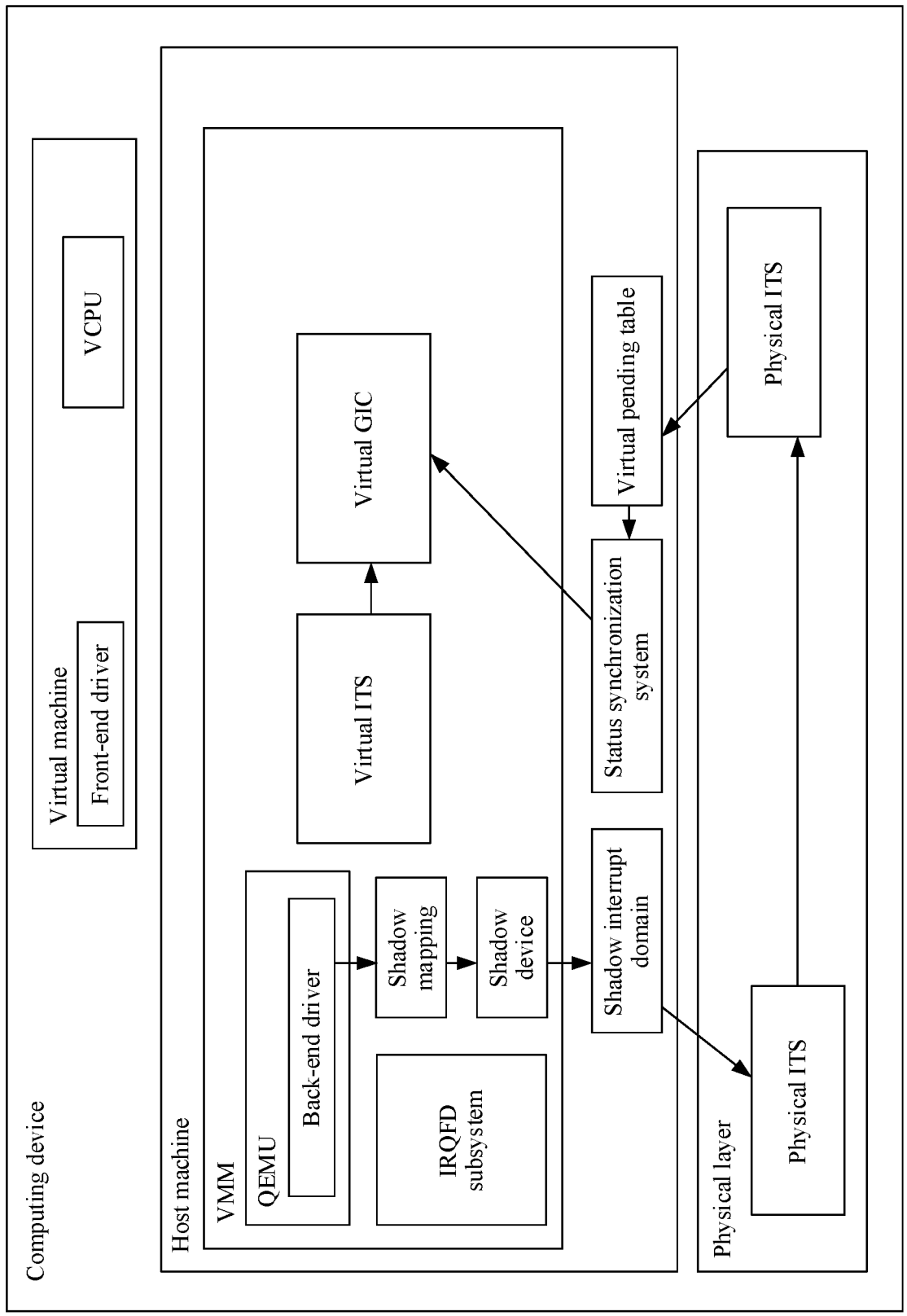
FIG. 7 is a schematic diagram of interrupt handling according to some embodiments of the present disclosure.

The following describes a computing device provided in some embodiments of the present disclosure with reference to FIG. 6. As shown in FIG. 6, the computing device provided in this embodiment of the present disclosure includes a virtual machine, a host machine, and a hardware layer. A virtual device in the virtual machine may trigger an interrupt, and a corresponding front-end driver enables the virtual interrupt. A back-end driver in the host machine may obtain a behavior of enabling the virtual interrupt by the front-end driver, and trigger the virtual interrupt. An IRQFD subsystem may receive the virtual interrupt triggered by the back-end driver, and transfer the virtual interrupt to a shadow device module. The shadow device module may determine a physical interrupt identifier of the virtual interrupt, and the shadow interrupt domain transfers the physical interrupt identifier to a physical ITS on the hardware layer by using a physical ITS driver. The physical ITS may determine a virtual interrupt identifier corresponding to the physical interrupt identifier and a target virtual processor, and the physical GIC transfers the virtual interrupt identifier to the target virtual processor VCPU. The following describes a computing device provided in some embodiments of the present disclosure with reference to FIG. 7. As shown in FIG. 7, the computing device provided in this embodiment of the present disclosure includes a virtual machine, a host machine, and a hardware layer. To ensure interrupt state consistency between software and hardware, a virtual GIC in a VMM needs to obtain interrupt state information in a physical GIC and update interrupt state information of a corresponding virtual interrupt. In some embodiments, as shown in FIG. 7, a back-end driver may trigger a status synchronization request, where the request carries information related to a virtual interrupt that needs to be synchronized. Shadow mapping and a shadow object may decode virtual interrupt information of a virtual device and convert the virtual interrupt information into a corresponding physical interrupt identifier, and a shadow interrupt domain transfers the physical interrupt identifier to a physical ITS at a physical layer. A physical GIC may transfer interrupt state information related to the physical interrupt identifier to a table (for example, a pending table) that stores the interrupt state information in the host machine. Further, a state synchronization system may transfer the interrupt state information related to the physical interrupt identifier to the virtual GIC, so that the virtual GIC updates the interrupt state information of the virtual interrupt.

Figure 8:
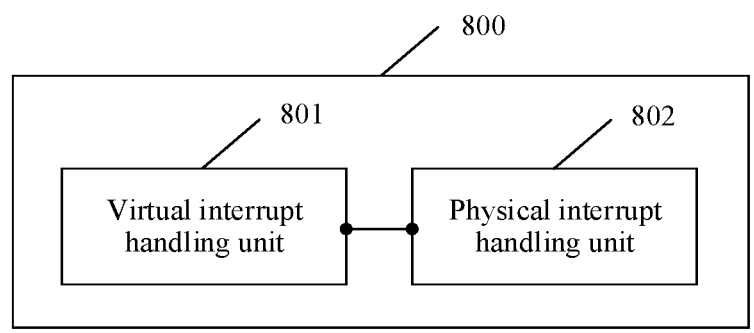
FIG. 8 is a schematic diagram of an interrupt handling apparatus according to some embodiments of the present disclosure.

FIG. 8 is a schematic diagram of a structure of an interrupt handling apparatus 800 according to some embodiments of the present disclosure. The computing device includes a hardware layer and a host machine running on the hardware layer. The interrupt handling apparatus includes a virtual interrupt handling unit 801 deployed on the host machine and a physical interrupt handling unit 802 deployed on the hardware layer.

The virtual interrupt handling unit 801 is configured to obtain a virtual interrupt, obtain a corresponding physical interrupt identifier based on the virtual interrupt, and transfer the physical interrupt identifier to the hardware layer.

The physical interrupt handling unit 802 is configured to obtain, based on the physical interrupt identifier, a corresponding virtual interrupt identifier and a corresponding virtual processor identifier, where the virtual interrupt is configured to interrupt a target virtual processor, the virtual interrupt and the physical interrupt identifier uniquely correspond to the virtual processor identifier, and the virtual processor identifier indicates the target virtual processor; and transfer the virtual interrupt identifier to the target virtual processor.

Figure 2B:
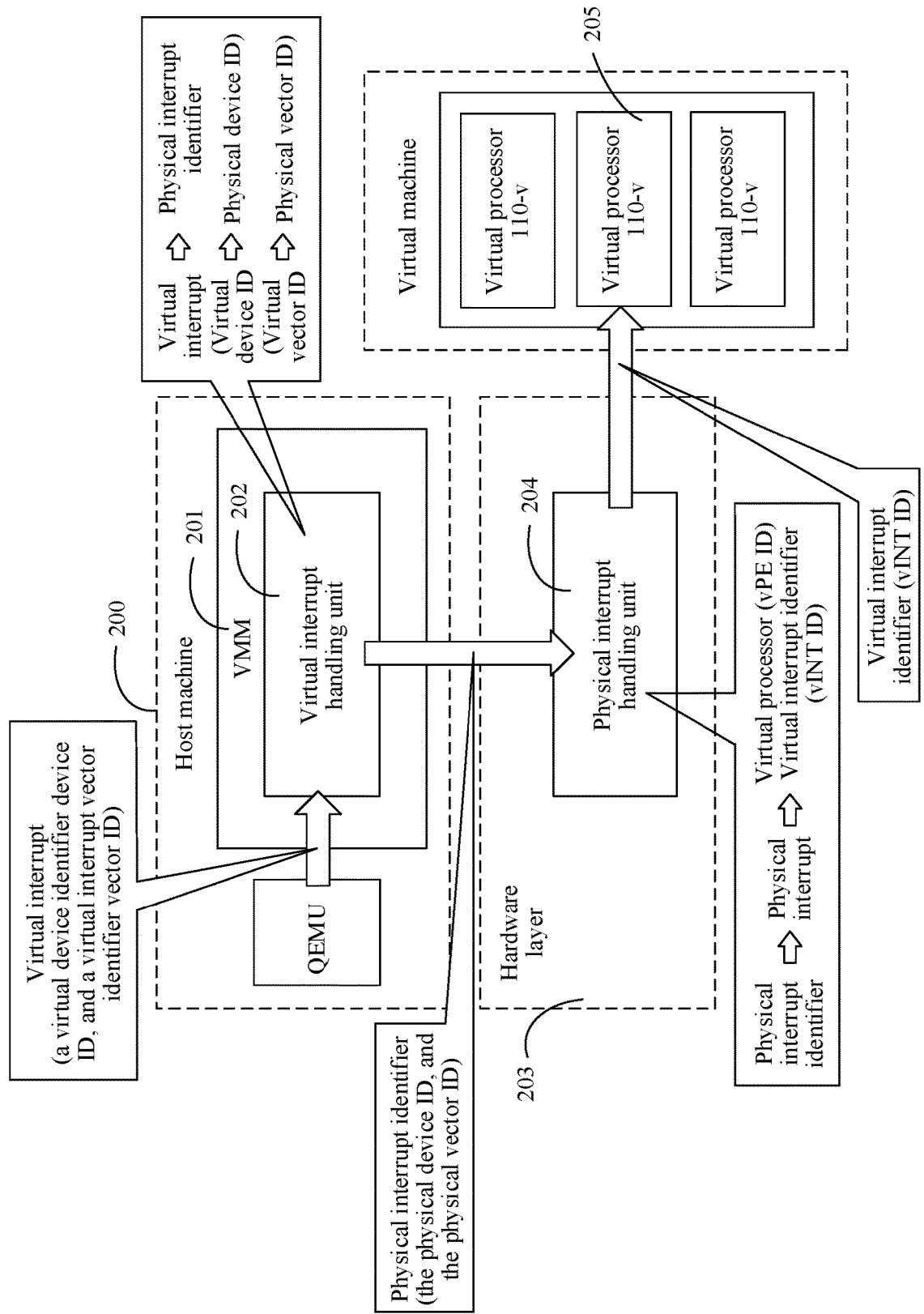
FIG. 2b is a schematic diagram of interrupt handling according to some embodiments of the present disclosure.

The virtual interrupt handling unit 801 may be equivalent to the virtual interrupt management unit 181 shown in FIG. 1, the virtual interrupt handling unit 202 shown in FIG. 2a and FIG. 2b, and the shadow mapping, the shadow device, and the shadow interrupt domain shown in FIG. 3 to FIG. 7.

The physical interrupt handling unit 802 may be equivalent to the physical interrupt management unit 160 shown in FIG. 1, the physical interrupt handling unit 204 shown in FIG. 2a and FIG. 2b, and the physical ITS and the physical generic interrupt controller GIC shown in FIG. 3 to FIG. 7.

In some embodiments, the virtual interrupt uniquely corresponds to the virtual interrupt identifier.

In some embodiments, the computing device includes a physical interrupt translation service ITS and a physical generic interrupt controller GIC that are implemented based on the hardware layer.

The physical ITS is configured to obtain, based on the physical interrupt identifier, the corresponding virtual interrupt identifier and the corresponding virtual processor identifier.

The physical GIC is configured to transfer the virtual interrupt identifier to the target virtual processor.

In some embodiments, the virtual interrupt handling unit 801 is further configured to obtain, based on the virtual interrupt and a preconfigured first mapping relationship, the physical interrupt identifier corresponding to the virtual interrupt, where the first mapping relationship indicates a plurality of virtual interrupts and a correspondence between each virtual interrupt and a physical interrupt identifier.

The physical interrupt handling unit 802 is further configured to obtain, based on the physical interrupt identifier and a preconfigured second mapping relationship, the virtual interrupt identifier corresponding to the physical interrupt, where the second mapping relationship indicates a plurality of physical interrupt identifiers and a correspondence between each physical interrupt identifier and a virtual interrupt identifier.

In some embodiments, the physical interrupt handling unit 802 is further configured to obtain, based on the physical interrupt identifier and a preconfigured third mapping relationship, the corresponding virtual processor identifier, where the third mapping relationship indicates a plurality of physical interrupt identifiers and a correspondence between each physical interrupt identifier and a virtual processor identifier.

In some embodiments, the physical interrupt handling unit 802 is further configured to generate a physical interrupt based on the physical interrupt identifier; and obtain the virtual interrupt identifier and the virtual processor identifier based on the physical interrupt.

In some embodiments, the virtual interrupt includes a virtual device identifier and a virtual interrupt vector identifier.

The virtual interrupt handling unit 801 is further configured to obtain, based on the virtual interrupt, a physical device identifier corresponding to the virtual device identifier and a physical interrupt vector identifier corresponding to the virtual interrupt vector identifier, where the physical interrupt identifier includes the physical device identifier and the physical interrupt vector identifier.

In some embodiments, the physical interrupt handling unit 802 is further configured to obtain interrupt state information corresponding to the physical interrupt identifier, where the interrupt state information indicates whether the virtual interrupt identifier corresponding to the physical interrupt identifier can be transferred to the virtual processor, and the interrupt state information includes at least one of the following: an interrupt pending state, an interrupt priority state, and an interrupt enable state; and determine, based on the interrupt state information, that the virtual interrupt identifier can be transferred to the virtual processor.

In some embodiments, the virtual interrupt handling unit 801 is further configured to:

obtain the interrupt state information corresponding to the physical interrupt identifier from the hardware layer in a virtual machine live migration process, where the interrupt state information indicates whether the virtual interrupt identifier corresponding to the physical interrupt identifier can be transferred to the virtual processor, and the interrupt state information includes at least one of the following: the interrupt pending state, the interrupt priority state, and the interrupt enable state; and write the interrupt state information into a hardware layer of a computing device other than the computing device.

The present disclosure further provides a non-volatile computer-readable storage medium, where the non-volatile computer-readable storage medium includes computer instructions used to perform an interrupt handling method. The method is applied to a host machine, the host machine is located in a computing device, and the computing device includes a hardware layer. The non-volatile computer-readable storage medium includes a first computer instruction used to obtain a virtual interrupt.

The non-volatile computer-readable storage medium includes a second computer instruction used to obtain a corresponding physical interrupt identifier based on the virtual interrupt, and transfer the physical interrupt identifier to the hardware layer.

In some embodiments, the first computer instruction is used to obtain, based on the virtual interrupt and a preconfigured first mapping relationship, the corresponding physical interrupt identifier.

In some embodiments, the virtual interrupt includes a virtual device identifier and a virtual interrupt vector identifier.

The first computer instruction is configured to obtain, based on the virtual interrupt, a physical device identifier corresponding to the virtual device identifier and a physical interrupt vector identifier corresponding to the virtual interrupt vector identifier. The physical interrupt identifier includes the physical device identifier and the physical interrupt vector identifier.

In some embodiments, the non-volatile computer-readable storage medium further includes a third computer instruction used to obtain interrupt state information corresponding to the physical interrupt identifier from the hardware layer in a virtual machine live migration process, where the interrupt state information includes at least one of the following: pending information, priority information, and enabling information; and write the interrupt state information into a hardware layer of a computing device other than the computing device.

The present disclosure further provides a non-volatile computer-readable storage medium. The non-volatile computer-readable storage medium includes computer instructions. When the computer instructions are executed by a computer, the interrupt handling method in the foregoing embodiments can be implemented.

Figure 9:
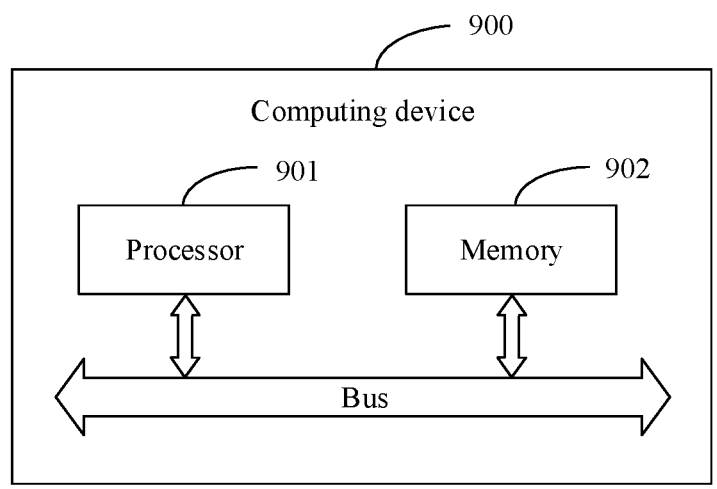
FIG. 9 is a schematic diagram of a computing device according to some embodiments of the present disclosure.

FIG. 9 is a schematic diagram of a computing device 900 according to some embodiments of the present disclosure. As shown in FIG. 9, the computing device 900 includes a processor 901 and a memory 902 that are connected through a bus. The processor 901 may invoke code in the memory 902 to implement the interrupt handling method in the foregoing embodiments.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed systems, apparatuses, and methods may be implemented in other manners. For example, the foregoing described apparatus embodiments are merely examples. For example, division into the units is merely a logical function division and may be another division in other embodiments. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all the units may be selected according to actual needs to achieve the objectives of the solutions of embodiments.

In addition, functional units in embodiments of the present disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the functions may be stored in a computer-readable storage medium. Based on such an understanding, the technical solutions in the present disclosure essentially, or the part contributing to the conventional technology, or all or a part of the technical solutions may be implemented in a form of a software product. The computer software product is stored in a storage medium and includes several instructions for instructing a computer device (which may be a personal computer, a server, or another network device) to perform all or a part of the steps of the methods in the embodiment of FIG. 2*a* of the present disclosure. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of the present disclosure.

What is claimed is:

1. A computing device, comprising:
a hardware layer; and a host machine executing on the hardware layer, wherein the host machine is configured to:
obtain a virtual interrupt;
obtain a physical interrupt identifier corresponding to the virtual interrupt; and
transfer the physical interrupt identifier to the hardware layer; and
wherein the hardware layer is configured to:
obtain a virtual interrupt identifier based on the physical interrupt identifier and a preconfigured second mapping relationship;
obtain a virtual processor identifier based on the physical interrupt identifier and a preconfigured third mapping relationship, wherein the virtual processor identifier corresponds to a target virtual processor to which the virtual interrupt, obtained by the host machine, is configured to interrupt; and
transfer the virtual interrupt identifier, which is based on the physical interrupt identifier and the preconfigured second mapping relationship, to the target virtual processor.

2. The computing device according to claim 1, wherein the virtual interrupt uniquely corresponds to the virtual interrupt identifier.

3. The computing device according to claim 1, wherein:
the computing device comprises a physical interrupt translation service (ITS) and a physical generic interrupt controller (GIC) that are implemented based on the hardware layer;
the physical ITS is configured to obtain the virtual interrupt identifier and the virtual processor identifier corresponding to the physical interrupt identifier; and
the physical GIC is configured to transfer the virtual interrupt identifier to the target virtual processor.

4. The computing device according to claim 1, wherein:
the host machine is further configured to obtain, based on the virtual interrupt and a preconfigured first mapping relationship, the physical interrupt identifier corresponding to the virtual interrupt, wherein the preconfigured first mapping relationship indicates a plurality of virtual interrupts and a correspondence between each one of the plurality of virtual interrupts and one of a plurality of physical interrupt identifiers; and
wherein the preconfigured second mapping relationship indicates a plurality of physical interrupt identifiers and a correspondence between each one of the plurality of physical interrupt identifiers and one of a plurality of virtual interrupt identifiers.

5. The computing device according to claim 1, wherein the preconfigured third mapping relationship indicates a plurality of physical interrupt identifiers and a correspondence between each one of the plurality of physical interrupt identifiers and one of a plurality of virtual processor identifiers.

6. The computing device according to claim 1, wherein the hardware layer is further configured to:
generate a physical interrupt based on the physical interrupt identifier; and
obtain the virtual interrupt identifier and the virtual processor identifier based on the physical interrupt.

7. The computing device according to claim 1, wherein:
the virtual interrupt comprises a virtual device identifier and a virtual interrupt vector identifier; and
the host machine is further configured to obtain, based on the virtual interrupt, a physical device identifier corresponding to the virtual device identifier and a physical interrupt vector identifier corresponding to the virtual interrupt vector identifier, wherein the physical interrupt identifier comprises the physical device identifier and the physical interrupt vector identifier.

8. The computing device according to claim 1, wherein the hardware layer is further configured to:
obtain interrupt state information corresponding to the physical interrupt identifier, wherein the interrupt state information indicates whether the virtual interrupt identifier corresponding to the physical interrupt identifier can be transferred to the target virtual processor; and
determine, based on the interrupt state information, that the virtual interrupt identifier can be transferred to the target virtual processor.

9. The computing device according to claim 1, wherein the host machine is further configured to:
obtain interrupt state information corresponding to the physical interrupt identifier from the hardware layer in a virtual machine live migration process, wherein the interrupt state information indicates whether the virtual interrupt identifier corresponding to the physical interrupt identifier can be transferred to the target virtual processor; and
write the interrupt state information into a hardware layer of another computing device other than the computing device.

10. An interrupt handling method, comprising:
obtaining, by a host machine running on a hardware layer, a virtual interrupt;
obtaining, by the host machine, a physical interrupt identifier corresponding to the virtual interrupt;
transferring the physical interrupt identifier to the hardware layer, so that the hardware layer obtains a virtual interrupt identifier based on the physical interrupt identifier and a preconfigured second mapping relationship, and obtains a virtual processor identifier based on the physical interrupt identifier and a preconfigured third mapping relationship, wherein the virtual processor identifier corresponds to a target virtual processor to which the virtual interrupt, obtained by the host machine, is configured to interrupt; and
transferring the virtual interrupt identifier, which is based on the physical interrupt identifier and the preconfigured second mapping relationship, to the target virtual processor.

11. The method according to claim 10, wherein the virtual interrupt uniquely corresponds to the virtual interrupt identifier.

12. The method according to claim 10, wherein the obtaining a corresponding physical interrupt identifier based on the virtual interrupt comprises:
obtaining, based on the virtual interrupt and a preconfigured first mapping relationship, the physical interrupt identifier corresponding to the virtual interrupt, wherein the preconfigured first mapping relationship indicates a plurality of virtual interrupts and a correspondence between each one of the plurality of virtual interrupts and one of a plurality of physical interrupt identifiers.

13. The method according to claim 10, wherein the virtual interrupt comprises a virtual device identifier and a virtual interrupt vector identifier, and wherein the obtaining the physical interrupt identifier based on the virtual interrupt comprises:
obtaining, based on the virtual interrupt, a physical device identifier corresponding to the virtual device identifier and a physical interrupt vector identifier corresponding to the virtual interrupt vector identifier, wherein the physical interrupt identifier comprises the physical device identifier and the physical interrupt vector identifier.

14. The method according to claim 10, wherein the method further comprises:
obtaining interrupt state information corresponding to the physical interrupt identifier from the hardware layer in a virtual machine live migration process, wherein the interrupt state information indicates whether the virtual interrupt identifier corresponding to the physical interrupt identifier can be transferred to the target virtual processor; and
writing the interrupt state information into a hardware layer of a computing device other than the computing device.

15. An interrupt handling method, comprising:
obtaining, by a hardware layer, a virtual interrupt identifier based on a physical interrupt identifier and a preconfigured second mapping relationship, and obtaining a virtual processor identifier based on the physical interrupt identifier and a preconfigured third mapping relationship, wherein the virtual processor identifier corresponds to a target virtual processor to which the virtual interrupt is configured to interrupt; and
transferring the virtual interrupt identifier, which is based on the physical interrupt identifier and the preconfigured second mapping relationship, to the target virtual processor.

16. The method according to claim 15, wherein the virtual interrupt uniquely corresponds to the virtual interrupt identifier.

17. The method according to claim 15, wherein the method is applied to a computing device, and wherein:
the computing device comprises a physical interrupt translation service (ITS) and a physical generic interrupt controller (GIC) that are implemented based on the hardware layer;
the obtaining of the virtual interrupt identifier and the virtual processor identifier further comprises:
obtaining, by the physical ITS based on the physical interrupt identifier, the virtual interrupt identifier and the virtual processor identifier; and
the transferring the virtual interrupt identifier to the target virtual processor comprises:
transferring, by the physical GIC, the virtual interrupt identifier to the target virtual processor.

18. The method according to claim 15, wherein
the preconfigured second mapping relationship indicates a plurality of physical interrupt identifiers and a correspondence between each one of the plurality of physical interrupt identifiers and one of a plurality of virtual interrupt identifiers.

19. The method according to claim 15, wherein the preconfigured third mapping relationship indicates a plurality of physical interrupt identifiers and a correspondence between each one of the plurality of physical interrupt identifiers and one of a plurality of virtual processor identifiers.

20. The method according to claim 15, wherein the obtaining of the virtual interrupt identifier and the virtual processor identifier comprises:
generating, by the hardware layer, a physical interrupt based on the physical interrupt identifier; and
obtaining the virtual interrupt identifier and the virtual processor identifier based on the physical interrupt.

* * * * *